US011556039B2

United States Patent
N'Gom et al.

(10) Patent No.: US 11,556,039 B2
(45) Date of Patent: Jan. 17, 2023

(54) ELECTROCHROMIC COATED GLASS ARTICLES AND METHODS FOR LASER PROCESSING THE SAME

(71) Applicant: Corning Incorporated, Corning, NY (US)

(72) Inventors: Moussa N'Gom, Painted Post, NY (US); David Andrew Pastel, Horseheads, NY (US); Garrett Andrew Piech, Corning, NY (US); Robert Stephen Wagner, Corning, NY (US); Chad Michael Wilcox, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 386 days.

(21) Appl. No.: 15/288,071

(22) Filed: Oct. 7, 2016

(65) Prior Publication Data

US 2017/0023841 A1    Jan. 26, 2017

Related U.S. Application Data

(63) Continuation-in-part of application No. 14/530,457, filed on Oct. 31, 2014, now abandoned.
(Continued)

(51) Int. Cl.
*G02F 1/153* (2006.01)
*C03B 33/02* (2006.01)
(Continued)

(52) U.S. Cl.
CPC ............ *G02F 1/1524* (2019.01); *B23K 26/53* (2015.10); *B32B 17/00* (2013.01); *C03B 33/0222* (2013.01); *C03B 33/091* (2013.01);

*C03C 17/23* (2013.01); *G02F 1/1533* (2013.01); *B23K 2103/54* (2018.08); *C03B 33/04* (2013.01);
(Continued)

(58) Field of Classification Search
CPC ........ G02F 1/155; G02F 1/157; G02F 1/1523; B60R 1/088; B60R 1/12; C23C 14/083
See application file for complete search history.

(56) References Cited

U.S. PATENT DOCUMENTS

| 1,529,243 A | 3/1925 | Drake et al. |
| 1,626,396 A | 4/1927 | Drake |

(Continued)

FOREIGN PATENT DOCUMENTS

| CN | 1259924 A | 7/2000 |
| CN | 2388062 Y | 7/2000 |

(Continued)

OTHER PUBLICATIONS

Kerr, "Filamentary tracks formed in transparent optical glass by laser beam self-focusing. II. Theoretical Analysis" Physical Review A 4(3), Sep. 1971, pp. 1195-1218.
(Continued)

*Primary Examiner* — Helena Kosanovic
*Assistant Examiner* — Lawrence H Samuels

(57) ABSTRACT

Disclosed herein are glass articles coated on at least one surface with an electrochromic layer and comprising minimal regions of laser damage, and methods for laser processing such glass articles. Insulated glass units comprising such coated glass articles are also disclosed herein.

21 Claims, 4 Drawing Sheets

Related U.S. Application Data

(60) Provisional application No. 62/022,896, filed on Jul. 10, 2014, provisional application No. 61/917,092, filed on Dec. 17, 2013.

(51) Int. Cl.

| | | |
|---|---|---|
| *B23K 26/00* | (2014.01) | |
| *G02F 1/1524* | (2019.01) | |
| *B32B 17/00* | (2006.01) | |
| *C03C 17/23* | (2006.01) | |
| *B23K 26/53* | (2014.01) | |
| *C03B 33/09* | (2006.01) | |
| *C03B 33/04* | (2006.01) | |
| *B23K 103/00* | (2006.01) | |

(52) U.S. Cl.
 CPC .. *C03C 2217/219* (2013.01); *C03C 2218/328* (2013.01)

(56) References Cited

U.S. PATENT DOCUMENTS

| | | |
|---|---|---|
| 1,790,397 A | 1/1931 | Woods et al. |
| 2,682,134 A | 6/1954 | Stookey |
| 2,749,794 A | 6/1956 | O'Leary |
| 2,754,956 A | 7/1956 | Sommer |
| 3,647,410 A | 3/1972 | Heaton et al. |
| 3,673,900 A | 7/1972 | Jendrisak et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 3,947,093 A | 3/1976 | Goshima et al. |
| 4,076,159 A | 2/1978 | Farragher |
| 4,226,607 A | 10/1980 | Domken |
| 4,441,008 A | 4/1984 | Chan |
| 4,546,231 A | 10/1985 | Gresser et al. |
| 4,618,056 A | 10/1986 | Cutshall |
| 4,623,776 A | 11/1986 | Buchroeder et al. |
| 4,642,439 A | 2/1987 | Miller et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,951,457 A | 8/1990 | Deal |
| 4,997,250 A | 3/1991 | Ortiz, Jr. |
| 5,035,918 A | 7/1991 | Vyas |
| 5,040,182 A | 8/1991 | Spinelli et al. |
| 5,104,210 A | 4/1992 | Tokas |
| 5,104,523 A | 4/1992 | Masaharu et al. |
| 5,108,857 A | 4/1992 | Kitayama et al. |
| 5,112,722 A | 5/1992 | Tsujino et al. |
| 5,114,834 A | 5/1992 | Nachshon |
| 5,221,034 A | 6/1993 | Bando |
| 5,256,853 A | 10/1993 | McIntyre |
| 5,265,107 A | 11/1993 | Delfyett, Jr. |
| 5,326,956 A | 7/1994 | Lunney |
| 5,400,350 A | 3/1995 | Galvanauskas |
| 5,410,567 A | 4/1995 | Brundage et al. |
| 5,418,803 A | 5/1995 | Zhiglinsky et al. |
| 5,434,875 A | 7/1995 | Rieger et al. |
| 5,436,925 A | 7/1995 | Lin et al. |
| 5,475,197 A | 12/1995 | Wrobel et al. |
| 5,521,352 A | 5/1996 | Lawson |
| 5,541,774 A | 7/1996 | Blankenbecler |
| 5,553,093 A | 9/1996 | Ramaswamy et al. |
| 5,574,597 A | 11/1996 | Kataoka et al. |
| 5,578,229 A | 11/1996 | Barnekov et al. |
| 5,586,138 A | 12/1996 | Yokoyama |
| 5,656,186 A | 8/1997 | Mourou et al. |
| 5,676,866 A | 10/1997 | In Den Baumen et al. |
| 5,684,642 A | 11/1997 | Zumoto et al. |
| 5,692,703 A | 12/1997 | Murphy et al. |
| 5,696,782 A | 12/1997 | Harter et al. |
| 5,715,346 A | 2/1998 | Liu |
| 5,736,061 A | 4/1998 | Fukada et al. |
| 5,736,709 A | 4/1998 | Neiheisel |
| 5,776,220 A | 7/1998 | Allaire et al. |
| 5,781,684 A | 7/1998 | Liu |
| 5,796,112 A | 8/1998 | Ichie |
| 5,854,490 A | 12/1998 | Ooaeh et al. |
| 5,854,751 A | 12/1998 | Di et al. |
| 5,878,866 A | 3/1999 | Lisec |
| 5,968,441 A | 10/1999 | Seki |
| 6,003,418 A | 12/1999 | Bezama |
| 6,016,223 A | 1/2000 | Suzuki et al. |
| 6,016,324 A | 1/2000 | Rieger et al. |
| 6,027,062 A | 2/2000 | Bacon et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,137,632 A | 10/2000 | Bernacki |
| 6,156,030 A | 12/2000 | Neev |
| 6,160,835 A | 12/2000 | Kwon |
| 6,185,051 B1 | 2/2001 | Chen et al. |
| 6,186,384 B1 | 2/2001 | Sawada |
| 6,191,880 B1 | 2/2001 | Schuster |
| 6,210,401 B1 | 4/2001 | Lai |
| 6,256,328 B1 | 7/2001 | Delfyett et al. |
| 6,259,058 B1 | 7/2001 | Hoekstra |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,461,223 B1 | 10/2002 | Bando |
| 6,484,052 B1 | 11/2002 | Visuri et al. |
| 6,489,589 B1 | 12/2002 | Alexander |
| 6,501,576 B1 | 12/2002 | Seacombe |
| 6,501,578 B1 | 12/2002 | Bernstein et al. |
| 6,520,057 B1 | 2/2003 | Steadman |
| 6,552,301 B2 | 4/2003 | Herman et al. |
| 6,573,026 B1 | 6/2003 | Aitken et al. |
| 6,592,703 B1 | 7/2003 | Habeck et al. |
| 6,611,647 B2 | 8/2003 | Berkey et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,151 B1 | 5/2004 | Thompson |
| 6,729,161 B1 | 5/2004 | Miura et al. |
| 6,737,345 B1 | 5/2004 | Lin et al. |
| 6,744,009 B1 | 6/2004 | Xuan et al. |
| 6,787,732 B1 | 9/2004 | Xuan et al. |
| 6,791,935 B2 | 9/2004 | Hatano et al. |
| 6,800,237 B1 | 10/2004 | Yamamoto et al. |
| 6,800,831 B1 | 10/2004 | Hoetzel |
| 6,856,379 B2 | 2/2005 | Schuster |
| 6,885,502 B2 | 4/2005 | Schuster |
| 6,904,218 B2 | 6/2005 | Sun et al. |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,102,118 B2 | 9/2006 | Acker et al. |
| 7,187,833 B2 | 3/2007 | Mishra |
| 7,196,841 B2 | 3/2007 | Melzer et al. |
| 7,259,354 B2 | 8/2007 | Pailthorp et al. |
| 7,353,829 B1 | 4/2008 | Wachter et al. |
| 7,402,773 B2 | 7/2008 | Nomaru |
| 7,408,616 B2 | 8/2008 | Gruner et al. |
| 7,408,622 B2 | 8/2008 | Fiolka et al. |
| 7,511,886 B2 | 3/2009 | Schultz et al. |

(56) References Cited

U.S. PATENT DOCUMENTS

| | | | |
|---|---|---|---|
| 7,535,634 B1 | 5/2009 | Savchenkov et al. |
| 7,555,187 B2 | 6/2009 | Bickham et al. |
| 7,565,820 B2 | 7/2009 | Foster et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 7,794,904 B2 | 9/2010 | Brueck |
| 7,800,734 B2 | 9/2010 | Komatsuda |
| 7,832,675 B2 | 11/2010 | Bumgarner et al. |
| 7,901,967 B2 | 3/2011 | Komura et al. |
| 7,920,337 B2 | 4/2011 | Perchak |
| 7,978,408 B2 | 7/2011 | Sawabe et al. |
| 8,035,803 B2 | 10/2011 | Fiolka |
| 8,035,882 B2 * | 10/2011 | Fanton ............... G02F 1/1533 359/265 |
| 8,035,901 B2 | 10/2011 | Abramov et al. |
| 8,041,127 B2 | 10/2011 | Whitelaw |
| 8,068,279 B2 | 11/2011 | Schuster et al. |
| 8,104,385 B2 | 1/2012 | Hayashi et al. |
| 8,118,971 B2 | 2/2012 | Hori et al. |
| 8,123,515 B2 | 2/2012 | Schleelein |
| 8,132,427 B2 | 3/2012 | Brown et al. |
| 8,144,308 B2 | 3/2012 | Muramatsu |
| 8,158,514 B2 | 4/2012 | Krueger et al. |
| 8,164,818 B2 * | 4/2012 | Collins ............. B32B 17/10055 359/275 |
| 8,168,514 B2 * | 5/2012 | Garner ............... B23K 26/38 219/121.67 |
| 8,194,170 B2 | 6/2012 | Golub et al. |
| 8,211,259 B2 | 7/2012 | Sato et al. |
| 8,218,929 B2 | 7/2012 | Bickham et al. |
| 8,237,918 B2 | 8/2012 | Totzeck et al. |
| 8,245,539 B2 | 8/2012 | Lu et al. |
| 8,245,540 B2 | 8/2012 | Abramov et al. |
| 8,248,600 B2 | 8/2012 | Matousek et al. |
| 8,259,393 B2 | 9/2012 | Fiolka et al. |
| 8,269,138 B2 | 9/2012 | Garner et al. |
| 8,279,524 B2 | 10/2012 | Fiolka et al. |
| 8,283,595 B2 | 10/2012 | Fukuyo et al. |
| 8,283,695 B2 | 10/2012 | Salcedo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,339,578 B2 | 12/2012 | Omura |
| 8,341,976 B2 | 1/2013 | Dejneka et al. |
| 8,347,551 B2 | 1/2013 | Van Der Drift |
| 8,347,651 B2 | 1/2013 | Abramov et al. |
| 8,358,868 B2 | 1/2013 | Iketani |
| 8,358,888 B2 | 1/2013 | Ramachandran |
| 8,379,188 B2 | 2/2013 | Mueller et al. |
| 8,444,905 B2 | 5/2013 | Li et al. |
| 8,444,906 B2 | 5/2013 | Lee et al. |
| 8,448,471 B2 | 5/2013 | Kumatani et al. |
| 8,475,507 B2 | 7/2013 | Dewey et al. |
| 8,482,717 B2 | 7/2013 | Fiolka et al. |
| 8,491,983 B2 | 7/2013 | Ono et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,857 B2 | 1/2014 | Crosbie |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,687,932 B2 | 4/2014 | Peckham et al. |
| 8,697,228 B2 | 4/2014 | Carre et al. |
| 8,720,228 B2 | 5/2014 | Li |
| 8,724,937 B2 | 5/2014 | Barwicz et al. |
| 8,826,696 B2 | 9/2014 | Brown et al. |
| 8,842,358 B2 * | 9/2014 | Bareman ............ C03C 23/0025 359/267 |
| 8,847,112 B2 | 9/2014 | Panarello et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,028,613 B2 | 5/2015 | Kim et al. |
| 9,052,605 B2 | 6/2015 | Van et al. |
| 9,086,509 B2 | 7/2015 | Knutson |
| 9,138,913 B2 | 9/2015 | Arai et al. |
| 9,170,500 B2 | 10/2015 | Van et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,341,912 B2 * | 5/2016 | Shrivastava ............ G02F 1/153 |
| 9,346,706 B2 | 5/2016 | Bazemore et al. |
| 9,446,590 B2 | 9/2016 | Chen et al. |
| 9,477,037 B1 | 10/2016 | Bickham et al. |
| 9,481,598 B2 | 11/2016 | Bergh et al. |
| 9,499,343 B2 | 11/2016 | Cornelissen et al. |
| 9,517,929 B2 | 12/2016 | Hosseini |
| 9,517,963 B2 | 12/2016 | Marjanovic et al. |
| 9,701,581 B2 | 7/2017 | Kangastupa et al. |
| 9,703,167 B2 * | 7/2017 | Parker ............... B32B 17/10055 |
| 9,815,730 B2 | 11/2017 | Marjanovic et al. |
| 9,850,160 B2 | 12/2017 | Marjanovic et al. |
| 9,873,628 B1 | 1/2018 | Haloui et al. |
| 9,878,304 B2 | 1/2018 | Kotake et al. |
| 10,190,363 B2 * | 1/2019 | Behmke ............... G02F 1/0107 |
| 10,730,783 B2 | 8/2020 | Akarapu et al. |
| 2001/0019404 A1 | 9/2001 | Schuster et al. |
| 2001/0027842 A1 | 10/2001 | Curcio et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0097488 A1 | 7/2002 | Hay et al. |
| 2002/0110639 A1 | 8/2002 | Bruns |
| 2002/0126380 A1 | 9/2002 | Schuster |
| 2002/0139786 A1 | 10/2002 | Amako et al. |
| 2003/0006221 A1 | 1/2003 | Hong et al. |
| 2003/0007772 A1 | 1/2003 | Borrelli et al. |
| 2003/0007773 A1 | 1/2003 | Kondo et al. |
| 2003/0038225 A1 | 2/2003 | Mulder et al. |
| 2003/0070706 A1 | 4/2003 | Fujioka |
| 2003/0227663 A1 * | 12/2003 | Agrawal ............ B32B 17/10036 359/265 |
| 2004/0021615 A1 | 2/2004 | Benson et al. |
| 2004/0051982 A1 | 3/2004 | Perchak |
| 2004/0075717 A1 | 4/2004 | O'Brien et al. |
| 2004/0108467 A1 | 6/2004 | Eurlings et al. |
| 2004/0144231 A1 | 7/2004 | Hanada |
| 2004/0218882 A1 | 11/2004 | Bickham et al. |
| 2004/0221615 A1 | 11/2004 | Postupack et al. |
| 2004/0228593 A1 | 11/2004 | Sun et al. |
| 2005/0024743 A1 | 2/2005 | Camy-Peyret |
| 2005/0064707 A1 | 3/2005 | Sinha |
| 2005/0098458 A1 | 5/2005 | Gruetzmacher et al. |
| 2005/0098548 A1 | 5/2005 | Kobayashi et al. |
| 2005/0115938 A1 | 6/2005 | Sawaki et al. |
| 2005/0116938 A1 | 6/2005 | Ito et al. |
| 2005/0205778 A1 | 9/2005 | Kitai et al. |
| 2005/0209898 A1 | 9/2005 | Asai et al. |
| 2005/0231651 A1 | 10/2005 | Myers et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0021385 A1 | 2/2006 | Cimo et al. |
| 2006/0028706 A1 | 2/2006 | Totzeck et al. |
| 2006/0028728 A1 | 2/2006 | Li |
| 2006/0050261 A1 | 3/2006 | Brotsack |
| 2006/0109874 A1 | 5/2006 | Shiozaki et al. |
| 2006/0118529 A1 | 6/2006 | Aoki et al. |
| 2006/0127679 A1 | 6/2006 | Gulati et al. |

(56) References Cited

U.S. PATENT DOCUMENTS

| | | |
|---|---|---|
| 2006/0146384 A1 | 7/2006 | Schultz et al. |
| 2006/0151450 A1 | 7/2006 | You et al. |
| 2006/0170617 A1 | 8/2006 | Latypov et al. |
| 2006/0213883 A1 | 9/2006 | Eberhardt et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2006/0291835 A1 | 12/2006 | Nozaki et al. |
| 2007/0021548 A1 | 1/2007 | Hattori et al. |
| 2007/0030471 A1 | 2/2007 | Troost et al. |
| 2007/0044606 A1 | 3/2007 | Kang et al. |
| 2007/0045253 A1 | 3/2007 | Jordens et al. |
| 2007/0051706 A1 | 3/2007 | Bovatsek et al. |
| 2007/0053632 A1 | 3/2007 | Popp |
| 2007/0068648 A1 | 3/2007 | Hu et al. |
| 2007/0090180 A1 | 4/2007 | Griffis et al. |
| 2007/0091977 A1 | 4/2007 | Sohn et al. |
| 2007/0111119 A1 | 5/2007 | Hu et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0209029 A1 | 9/2007 | Ivonin et al. |
| 2007/0228616 A1 | 10/2007 | Bang |
| 2007/0298529 A1 | 12/2007 | Maeda et al. |
| 2008/0000884 A1 | 1/2008 | Sugiura et al. |
| 2008/0050584 A1 | 2/2008 | Noguchi et al. |
| 2008/0079940 A1 | 4/2008 | Sezerman et al. |
| 2008/0087629 A1 | 4/2008 | Shimomura et al. |
| 2008/0099444 A1 | 5/2008 | Misawa et al. |
| 2008/0158529 A1 | 7/2008 | Hansen |
| 2008/0165925 A1 | 7/2008 | Singer et al. |
| 2008/0190981 A1 | 8/2008 | Okajima et al. |
| 2008/0239268 A1 | 10/2008 | Mulder et al. |
| 2008/0309902 A1 | 12/2008 | Rosenbluth |
| 2008/0310465 A1 | 12/2008 | Achtenhagen |
| 2008/0314879 A1 | 12/2008 | Bruland et al. |
| 2008/0318028 A1 | 12/2008 | Winstanley et al. |
| 2009/0013724 A1 | 1/2009 | Koyo et al. |
| 2009/0032510 A1 | 2/2009 | Ando et al. |
| 2009/0033902 A1 | 2/2009 | Mulder et al. |
| 2009/0050661 A1 | 2/2009 | Na et al. |
| 2009/0060437 A1 | 3/2009 | Fini et al. |
| 2009/0091731 A1 | 4/2009 | Ossmann et al. |
| 2009/0104721 A1 | 4/2009 | Hirakata et al. |
| 2009/0157341 A1 | 6/2009 | Cheung |
| 2009/0170286 A1 | 7/2009 | Tsukamoto et al. |
| 2009/0176034 A1 | 7/2009 | Ruuttu et al. |
| 2009/0183764 A1 | 7/2009 | Meyer |
| 2009/0184849 A1 | 7/2009 | Nasiri et al. |
| 2009/0188543 A1 | 7/2009 | Bann |
| 2009/0199694 A1 | 8/2009 | Uh et al. |
| 2009/0212033 A1 | 8/2009 | Beck et al. |
| 2009/0242528 A1 | 10/2009 | Howerton et al. |
| 2009/0250446 A1 | 10/2009 | Sakamoto |
| 2009/0293910 A1 | 12/2009 | Ball et al. |
| 2009/0294419 A1 | 12/2009 | Abramov et al. |
| 2009/0294422 A1 | 12/2009 | Lubatschowski et al. |
| 2009/0323160 A1* | 12/2009 | Egerton ............... G02F 1/0147 359/275 |
| 2009/0323162 A1* | 12/2009 | Fanton ............... G02F 1/1533 359/275 |
| 2009/0324899 A1 | 12/2009 | Feinstein et al. |
| 2009/0324903 A1 | 12/2009 | Rumsby |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0027951 A1 | 2/2010 | Bookbinder et al. |
| 2010/0029460 A1 | 2/2010 | Shojiya et al. |
| 2010/0032087 A1 | 2/2010 | Takahashi et al. |
| 2010/0038349 A1 | 2/2010 | Ke et al. |
| 2010/0046761 A1 | 2/2010 | Henn et al. |
| 2010/0086741 A1 | 4/2010 | Bovatsek et al. |
| 2010/0089631 A1 | 4/2010 | Sakaguchi et al. |
| 2010/0089682 A1 | 4/2010 | Martini et al. |
| 2010/0089882 A1 | 4/2010 | Tamura |
| 2010/0102042 A1 | 4/2010 | Garner et al. |
| 2010/0129603 A1 | 5/2010 | Blick |
| 2010/0145620 A1 | 6/2010 | Georgi et al. |
| 2010/0147813 A1 | 6/2010 | Lei et al. |
| 2010/0197116 A1 | 8/2010 | Shah |
| 2010/0206008 A1 | 8/2010 | Harvey et al. |
| 2010/0252538 A1 | 10/2010 | Zeygerman |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0320179 A1 | 12/2010 | Morita et al. |
| 2010/0326138 A1 | 12/2010 | Kumatani et al. |
| 2010/0332087 A1 | 12/2010 | Claffee et al. |
| 2011/0017716 A1 | 1/2011 | Rumsby |
| 2011/0023298 A1 | 2/2011 | Chujo et al. |
| 2011/0037149 A1 | 2/2011 | Fukuyo et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0111179 A1 | 5/2011 | Blick et al. |
| 2011/0127244 A1 | 6/2011 | Li |
| 2011/0127697 A1 | 6/2011 | Milne |
| 2011/0132581 A1 | 6/2011 | Moss |
| 2011/0132881 A1 | 6/2011 | Liu |
| 2011/0136303 A1 | 6/2011 | Lee |
| 2011/0139760 A1 | 6/2011 | Shah et al. |
| 2011/0143470 A1 | 6/2011 | Lee |
| 2011/0177325 A1 | 7/2011 | Tomamoto et al. |
| 2011/0183116 A1 | 7/2011 | Hung et al. |
| 2011/0191024 A1 | 8/2011 | Deluca |
| 2011/0210105 A1 | 9/2011 | Romashko et al. |
| 2011/0238308 A1 | 9/2011 | Miller et al. |
| 2011/0240476 A1 | 10/2011 | Wang et al. |
| 2011/0240611 A1 | 10/2011 | Sandström et al. |
| 2011/0240617 A1 | 10/2011 | Cheon et al. |
| 2011/0261429 A1* | 10/2011 | Sbar ............... B32B 17/10981 156/256 |
| 2011/0277507 A1 | 11/2011 | Lu et al. |
| 2011/0300691 A1 | 12/2011 | Sakamoto et al. |
| 2011/0318555 A1 | 12/2011 | Bookbinder et al. |
| 2012/0017642 A1 | 1/2012 | Teranishi et al. |
| 2012/0026573 A1* | 2/2012 | Collins ............. B32B 17/10055 359/275 |
| 2012/0047951 A1 | 3/2012 | Dannoux et al. |
| 2012/0047956 A1 | 3/2012 | Li |
| 2012/0047957 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0106117 A1 | 5/2012 | Sundaram et al. |
| 2012/0111310 A1 | 5/2012 | Ryu et al. |
| 2012/0125588 A1 | 5/2012 | Nam et al. |
| 2012/0131961 A1 | 5/2012 | Dannoux et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0147449 A1* | 6/2012 | Bhatnagar ......... B32B 17/10174 359/275 |
| 2012/0196071 A1 | 8/2012 | Cornejo et al. |
| 2012/0196454 A1 | 8/2012 | Shah et al. |
| 2012/0205356 A1 | 8/2012 | Pluss |
| 2012/0211923 A1 | 8/2012 | Garner et al. |
| 2012/0214004 A1 | 8/2012 | Hashimoto et al. |
| 2012/0216570 A1 | 8/2012 | Abramov et al. |
| 2012/0229787 A1 | 9/2012 | Van et al. |
| 2012/0234049 A1 | 9/2012 | Bolton |

(56) References Cited

U.S. PATENT DOCUMENTS

| | | |
|---|---|---|
| 2012/0234807 A1 | 9/2012 | Sercel et al. |
| 2012/0237731 A1 | 9/2012 | Boegli et al. |
| 2012/0255935 A1 | 10/2012 | Kakui et al. |
| 2012/0262689 A1 | 10/2012 | Van et al. |
| 2012/0293784 A1 | 11/2012 | Xalter et al. |
| 2012/0297568 A1 | 11/2012 | Spezzani |
| 2012/0299219 A1 | 11/2012 | Shimoi et al. |
| 2012/0302139 A1 | 11/2012 | Darcangelo et al. |
| 2012/0320458 A1 | 12/2012 | Knutson |
| 2012/0324950 A1 | 12/2012 | Dale et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |
| 2013/0044371 A1 | 2/2013 | Rupp et al. |
| 2013/0047671 A1 | 2/2013 | Kohli |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0071079 A1 | 3/2013 | Peckham et al. |
| 2013/0071080 A1 | 3/2013 | Peckham et al. |
| 2013/0071081 A1 | 3/2013 | Peckham et al. |
| 2013/0075480 A1 | 3/2013 | Yokogi et al. |
| 2013/0078891 A1 | 3/2013 | Lee et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0126751 A1 | 5/2013 | Mizoguchi et al. |
| 2013/0129947 A1 | 5/2013 | Harvey et al. |
| 2013/0133367 A1 | 5/2013 | Abramov et al. |
| 2013/0136408 A1 | 5/2013 | Bookbinder et al. |
| 2013/0139708 A1 | 6/2013 | Hotta |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0171425 A1 | 7/2013 | Wang et al. |
| 2013/0174607 A1 | 7/2013 | Wootton et al. |
| 2013/0174610 A1 | 7/2013 | Teranishi et al. |
| 2013/0177033 A1 | 7/2013 | Muro et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0216573 A1 | 8/2013 | Trusheim et al. |
| 2013/0220982 A1 | 8/2013 | Thomas et al. |
| 2013/0221053 A1 | 8/2013 | Zhang |
| 2013/0222877 A1* | 8/2013 | Greer .................. G02F 1/1533 |
| | | 359/265 |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0248504 A1 | 9/2013 | Kusuda |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2013/0344684 A1 | 12/2013 | Bowden |
| 2014/0023087 A1 | 1/2014 | Czompo |
| 2014/0027951 A1 | 1/2014 | Srinivas et al. |
| 2014/0034730 A1 | 2/2014 | Lee |
| 2014/0036338 A1* | 2/2014 | Bareman .............. C03C 23/0025 |
| | | 359/267 |
| 2014/0042202 A1 | 2/2014 | Lee |
| 2014/0047957 A1 | 2/2014 | Wu |
| 2014/0076869 A1 | 3/2014 | Lee et al. |
| 2014/0083986 A1 | 3/2014 | Zhang et al. |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1* | 5/2014 | Fernando .............. B32B 27/36 |
| | | 428/76 |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0182125 A1* | 7/2014 | Rozbicki .............. C03C 17/3417 |
| | | 29/829 |
| 2014/0199519 A1 | 7/2014 | Schillinger et al. |
| 2014/0216108 A1 | 8/2014 | Weigel et al. |
| 2014/0238962 A1 | 8/2014 | Nawrodt et al. |
| 2014/0239034 A1 | 8/2014 | Cleary et al. |
| 2014/0239552 A1 | 8/2014 | Srinivas et al. |
| 2014/0290310 A1 | 10/2014 | Green |
| 2014/0291122 A1 | 10/2014 | Bando |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1* | 11/2014 | Bergh .............. B32B 17/10155 |
| | | 359/275 |
| 2014/0352400 A1 | 12/2014 | Barrilado et al. |
| 2014/0361463 A1 | 12/2014 | DeSimone et al. |
| 2015/0014891 A1 | 1/2015 | Amatucci et al. |
| 2015/0034612 A1 | 2/2015 | Hosseini et al. |
| 2015/0038313 A1 | 2/2015 | Hosseini |
| 2015/0044445 A1 | 2/2015 | Garner et al. |
| 2015/0059986 A1 | 3/2015 | Komatsu et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0121960 A1 | 5/2015 | Hosseini |
| 2015/0122656 A1 | 5/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Mattson et al. |
| 2015/0165548 A1 | 6/2015 | Marjanovic et al. |
| 2015/0165560 A1 | 6/2015 | Hackert et al. |
| 2015/0165561 A1 | 6/2015 | Le et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0209922 A1 | 7/2015 | Yoshikawa |
| 2015/0232369 A1 | 8/2015 | Marjanovic et al. |
| 2015/0299018 A1 | 10/2015 | Bhuyan et al. |
| 2015/0311058 A1 | 10/2015 | Antsiferov et al. |
| 2015/0350991 A1 | 12/2015 | Sayadi et al. |
| 2015/0352671 A1 | 12/2015 | Darzi |
| 2015/0360991 A1 | 12/2015 | Grundmueller et al. |
| 2015/0362817 A1* | 12/2015 | Patterson .............. G02F 1/161 |
| | | 359/275 |
| 2015/0362818 A1* | 12/2015 | Greer .................. G02F 1/1533 |
| | | 359/275 |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0009585 A1 | 1/2016 | Bookbinder et al. |
| 2016/0016257 A1 | 1/2016 | Hosseini |
| 2016/0023922 A1 | 1/2016 | Addiego et al. |
| 2016/0031737 A1 | 2/2016 | Hoppe et al. |
| 2016/0031745 A1 | 2/2016 | Ortner et al. |
| 2016/0039044 A1 | 2/2016 | Kawaguchi |
| 2016/0059359 A1 | 3/2016 | Krueger et al. |
| 2016/0060156 A1 | 3/2016 | Krueger et al. |
| 2016/0097960 A1* | 4/2016 | Dixit .................. G02F 1/153 |
| | | 359/275 |

(56) References Cited

U.S. PATENT DOCUMENTS

| | | |
|---|---|---|
| 2016/0111380 A1 | 4/2016 | Sundaram et al. |
| 2016/0138328 A1* | 5/2016 | Behmke ............... B32B 37/06 349/16 |
| 2016/0152516 A1 | 6/2016 | Bazemore et al. |
| 2016/0154284 A1 | 6/2016 | Sano |
| 2016/0159679 A1 | 6/2016 | West |
| 2016/0168396 A1 | 6/2016 | Letocart et al. |
| 2016/0279895 A1 | 9/2016 | Marjanovic et al. |
| 2016/0280580 A1 | 9/2016 | Bohme |
| 2016/0282521 A1 | 9/2016 | Uchiyama et al. |
| 2016/0290791 A1 | 10/2016 | Buono et al. |
| 2016/0311717 A1 | 10/2016 | Nieber et al. |
| 2016/0368100 A1 | 12/2016 | Marjanovic et al. |
| 2017/0002601 A1 | 1/2017 | Bergh et al. |
| 2017/0008791 A1 | 1/2017 | Kim et al. |
| 2017/0052381 A1 | 2/2017 | Huang et al. |
| 2017/0169847 A1 | 6/2017 | Tamaki |
| 2017/0183168 A1 | 6/2017 | Jia |
| 2017/0197868 A1 | 7/2017 | Gupta et al. |
| 2017/0225996 A1 | 8/2017 | Bookbinder et al. |
| 2017/0229318 A1 | 8/2017 | Tsunetomo et al. |
| 2017/0252859 A1 | 9/2017 | Kumkar et al. |
| 2017/0355634 A1 | 12/2017 | Dumenil |
| 2017/0368638 A1 | 12/2017 | Tayebati et al. |
| 2018/0029919 A1 | 2/2018 | Schnitzler et al. |
| 2018/0029920 A1 | 2/2018 | Marjanovic et al. |
| 2018/0062342 A1 | 3/2018 | Comstock et al. |
| 2018/0118602 A1 | 5/2018 | Hackert et al. |
| 2018/0133837 A1 | 5/2018 | Greenberg et al. |
| 2018/0134606 A1 | 5/2018 | Wagner et al. |
| 2018/0186677 A1 | 7/2018 | Ito et al. |
| 2018/0186678 A1 | 7/2018 | Boeker et al. |
| 2018/0297887 A1 | 10/2018 | Spier et al. |

FOREIGN PATENT DOCUMENTS

| | | |
|---|---|---|
| CN | 1473087 A | 2/2004 |
| CN | 1517313 A | 8/2004 |
| CN | 1573364 A | 2/2005 |
| CN | 1619778 A | 5/2005 |
| CN | 1735568 A | 2/2006 |
| CN | 1283409 C | 11/2006 |
| CN | 1890074 A | 1/2007 |
| CN | 1920632 A | 2/2007 |
| CN | 1930097 A | 3/2007 |
| CN | 101031383 A | 9/2007 |
| CN | 101043936 A | 9/2007 |
| CN | 101048255 A | 10/2007 |
| CN | 101386466 A | 3/2009 |
| CN | 101502914 A | 8/2009 |
| CN | 101595554 A | 12/2009 |
| CN | 101610870 A | 12/2009 |
| CN | 201357287 Y | 12/2009 |
| CN | 101622722 A | 1/2010 |
| CN | 101637849 A | 2/2010 |
| CN | 201471092 U | 5/2010 |
| CN | 101862907 A | 10/2010 |
| CN | 101965242 A | 2/2011 |
| CN | 101980982 A | 2/2011 |
| CN | 102046545 A | 5/2011 |
| CN | 102060437 A | 5/2011 |
| CN | 102105256 A | 6/2011 |
| CN | 102248302 A | 11/2011 |
| CN | 102272355 A | 12/2011 |
| CN | 102326232 A | 1/2012 |
| CN | 102343631 A | 2/2012 |
| CN | 102356049 A | 2/2012 |
| CN | 102356050 A | 2/2012 |
| CN | 102574246 A | 7/2012 |
| CN | 102596830 A | 7/2012 |
| CN | 102642092 A | 8/2012 |
| CN | 102649199 A | 8/2012 |
| CN | 102672355 A | 9/2012 |
| CN | 102674709 A | 9/2012 |
| CN | 102741012 A | 10/2012 |
| CN | 102898014 A | 1/2013 |
| CN | 102916081 A | 2/2013 |
| CN | 102923939 A | 2/2013 |
| CN | 102962583 A | 3/2013 |
| CN | 103013374 A | 4/2013 |
| CN | 103079747 A | 5/2013 |
| CN | 103086591 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103329035 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 105081564 A | 11/2015 |
| CN | 105164581 A | 12/2015 |
| CN | 105209218 A | 12/2015 |
| CN | 105246850 A | 1/2016 |
| CN | 103224117 B | 2/2016 |
| CN | 105392593 A | 3/2016 |
| CN | 105517969 A | 4/2016 |
| CN | 205328860 U | 6/2016 |
| CN | 106007349 A | 10/2016 |
| DE | 1020448 B | 12/1957 |
| DE | 2231330 A1 | 1/1974 |
| DE | 10322376 A1 | 12/2004 |
| DE | 102006042280 A1 | 6/2007 |
| DE | 102006035555 A1 | 1/2008 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 A1 | 5/2015 |
| DE | 102014213775 A1 | 1/2016 |
| DE | 102014116958 A1 | 5/2016 |
| DE | 102016102768 A1 | 8/2017 |
| EA | 004167 B1 | 2/2004 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1306196 A1 | 5/2003 |
| EP | 1159104 B1 | 8/2004 |
| EP | 1609559 A1 | 12/2005 |
| EP | 1043110 B1 | 8/2006 |
| EP | 1990125 A1 | 11/2008 |
| EP | 2105239 A1 | 9/2009 |
| EP | 2133170 A1 | 12/2009 |
| EP | 2202545 A1 | 6/2010 |
| EP | 2258512 A1 | 12/2010 |
| EP | 2398746 A1 | 12/2011 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| EP | 2922793 A1 | 9/2015 |
| EP | 3311947 A1 | 4/2018 |
| FR | 2989294 A1 | 10/2013 |
| GB | 0768515 A | 2/1957 |
| GB | 1242172 A | 8/1971 |
| GB | 2481190 B | 1/2015 |
| JP | 53-018756 A | 2/1978 |
| JP | 61-027212 A | 2/1986 |
| JP | 61-074794 A | 4/1986 |
| JP | 62-046930 A | 2/1987 |

(56) References Cited

FOREIGN PATENT DOCUMENTS

| | | |
|---|---|---|
| JP | 63-018756 A | 1/1988 |
| JP | 63-192561 A | 8/1988 |
| JP | 64-077001 A | 3/1989 |
| JP | 1179770 | 7/1989 |
| JP | 05-274085 A | 10/1993 |
| JP | 05-300544 A | 11/1993 |
| JP | 06-082720 A | 3/1994 |
| JP | 6318756 | 11/1994 |
| JP | 08-184581 A | 7/1996 |
| JP | 09-109243 A | 4/1997 |
| JP | 9106243 A | 4/1997 |
| JP | 11-079770 A | 3/1999 |
| JP | 11-197498 A | 7/1999 |
| JP | 11269683 A | 10/1999 |
| JP | 11-330597 A | 11/1999 |
| JP | 11-347861 A | 12/1999 |
| JP | 11347758 A | 12/1999 |
| JP | 2000-225485 A | 8/2000 |
| JP | 2000-327349 A | 11/2000 |
| JP | 2001-130921 A | 5/2001 |
| JP | 2001138083 A | 5/2001 |
| JP | 2001-179473 A | 7/2001 |
| JP | 2002-045985 A | 2/2002 |
| JP | 2002-205181 A | 7/2002 |
| JP | 2002210730 A | 7/2002 |
| JP | 2002228818 A | 8/2002 |
| JP | 2002-321081 A | 11/2002 |
| JP | 2003025085 A | 1/2003 |
| JP | 2003-062756 A | 3/2003 |
| JP | 2003-088985 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 3445250 B2 | 9/2003 |
| JP | 2003-340579 A | 12/2003 |
| JP | 2004-182530 A | 7/2004 |
| JP | 2004209675 A | 7/2004 |
| JP | 2004-348137 A | 12/2004 |
| JP | 2005-000952 A | 1/2005 |
| JP | 2005104819 A | 4/2005 |
| JP | 2005-135964 A | 5/2005 |
| JP | 2005-144487 A | 6/2005 |
| JP | 2005-179154 A | 7/2005 |
| JP | 2005-219960 A | 8/2005 |
| JP | 2005205440 A | 8/2005 |
| JP | 2005-263623 A | 9/2005 |
| JP | 2005288503 A | 10/2005 |
| JP | 2006-108478 A | 4/2006 |
| JP | 3775250 B2 | 5/2006 |
| JP | 3775410 B2 | 5/2006 |
| JP | 2006130691 A | 5/2006 |
| JP | 2006-150385 A | 6/2006 |
| JP | 2006-182009 A | 7/2006 |
| JP | 2006-240948 A | 9/2006 |
| JP | 3823108 B2 | 9/2006 |
| JP | 2006248885 A | 9/2006 |
| JP | 2006-327711 A | 12/2006 |
| JP | 2007021548 A | 2/2007 |
| JP | 2007196277 A | 8/2007 |
| JP | 2007253203 A | 10/2007 |
| JP | 2008-018547 A | 1/2008 |
| JP | 2008-132616 A | 6/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009056482 A | 3/2009 |
| JP | 2009-082958 A | 4/2009 |
| JP | 2009-084089 A | 4/2009 |
| JP | 2009-126779 A | 6/2009 |
| JP | 2009-142886 A | 7/2009 |
| JP | 2009-172633 A | 8/2009 |
| JP | 2009-178725 A | 8/2009 |
| JP | 2009-255114 A | 11/2009 |
| JP | 2009-269057 A | 11/2009 |
| JP | 2010-017990 A | 1/2010 |
| JP | 2010-042424 A | 2/2010 |
| JP | 4418282 B2 | 2/2010 |
| JP | 2010-046761 A | 3/2010 |
| JP | 4592855 B2 | 12/2010 |
| JP | 2011-011212 A | 1/2011 |
| JP | 2011-037707 A | 2/2011 |
| JP | 2011049398 A | 3/2011 |
| JP | 2011-512259 A | 4/2011 |
| JP | 4672689 B2 | 4/2011 |
| JP | 2011-517622 A | 6/2011 |
| JP | 2011517299 A | 6/2011 |
| JP | 2011-138083 A | 7/2011 |
| JP | 2011-520748 | 7/2011 |
| JP | 2011-147943 A | 8/2011 |
| JP | 2011-171334 A | 9/2011 |
| JP | 2011-240291 A | 12/2011 |
| JP | 4880820 B2 | 2/2012 |
| JP | 2012024782 A | 2/2012 |
| JP | 2012031018 A | 2/2012 |
| JP | 2012-506837 | 3/2012 |
| JP | 2012-517957 A | 8/2012 |
| JP | 2012159749 A | 8/2012 |
| JP | 2012-521889 | 9/2012 |
| JP | 2012-187618 A | 10/2012 |
| JP | 2012-232894 A | 11/2012 |
| JP | 2012-528772 A | 11/2012 |
| JP | 2013007842 A | 1/2013 |
| JP | 2013-031879 A | 2/2013 |
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-121908 A | 6/2013 |
| JP | 2013-132664 A | 7/2013 |
| JP | 2013-136075 A | 7/2013 |
| JP | 2013-144613 A | 7/2013 |
| JP | 2013-528492 A | 7/2013 |
| JP | 2013-150990 A | 8/2013 |
| JP | 2013-168445 A | 8/2013 |
| JP | 5274085 B2 | 8/2013 |
| JP | 2013-536081 A | 9/2013 |
| JP | 5300544 B2 | 9/2013 |
| JP | 2013187247 A | 9/2013 |
| JP | 5318748 B2 | 10/2013 |
| JP | 2013203630 A | 10/2013 |
| JP | 2013203631 A | 10/2013 |
| JP | 2013223886 A | 10/2013 |
| JP | 2013-245153 A | 12/2013 |
| JP | 2014-001102 A | 1/2014 |
| JP | 2014-037006 A | 2/2014 |
| JP | 2014-104484 A | 6/2014 |
| JP | 2014-117707 A | 6/2014 |
| JP | 2014-156289 A | 8/2014 |
| JP | 2015-030040 A | 2/2015 |
| JP | 2015-076115 A | 4/2015 |
| JP | 2015-091606 A | 5/2015 |
| JP | 2015-129076 A | 7/2015 |
| JP | 2015-519722 A | 7/2015 |
| JP | 2015-536896 A | 12/2015 |
| JP | 2015-543336 | 2/2016 |
| JP | 2016-021077 A | 2/2016 |
| JP | 2016-503383 A | 2/2016 |
| JP | 6061193 B2 | 1/2017 |
| KR | 2012015366 | 2/2002 |
| KR | 10-2002-0031573 A | 5/2002 |
| KR | 2009057161 | 6/2009 |
| KR | 10-2009-0107417 A | 10/2009 |
| KR | 2010-0120297 A | 11/2010 |
| KR | 1020621 | 3/2011 |
| KR | 10-2011-0120862 A | 11/2011 |
| KR | 2011-0121637 A | 11/2011 |
| KR | 10-2012-0000073 A | 1/2012 |
| KR | 10-1120471 B1 | 3/2012 |
| KR | 2012074508 | 7/2012 |
| KR | 2012-0102675 A | 9/2012 |
| KR | 2013-0031377 A | 3/2013 |
| KR | 2013031380 | 3/2013 |

(56) References Cited

FOREIGN PATENT DOCUMENTS

| | | |
|---|---|---|
| KR | 10-1259349 B1 | 4/2013 |
| KR | 1269474 | 5/2013 |
| KR | 10-2013-0075651 A | 7/2013 |
| KR | 2013-0079395 A | 7/2013 |
| KR | 10-2013-0111269 A | 10/2013 |
| KR | 2013124646 | 11/2013 |
| KR | 10-2013-0135873 A | 12/2013 |
| KR | 1344368 | 12/2013 |
| KR | 2014022980 | 2/2014 |
| KR | 2014022981 | 2/2014 |
| KR | 2014064220 | 5/2014 |
| KR | 20140064220 A | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201107253 A | 3/2011 |
| TW | 201139025 A | 11/2011 |
| TW | I362370 B | 4/2012 |
| TW | 201226345 | 7/2012 |
| TW | 201311592 A | 3/2013 |
| TW | 201331136 A | 8/2013 |
| TW | 201339111 A | 10/2013 |
| TW | 201433550 A | 9/2014 |
| TW | 201436968 A | 10/2014 |
| TW | I468354 B | 1/2015 |
| TW | I520804 B | 2/2016 |
| TW | 201612615 A | 4/2016 |
| WO | 98/21154 A1 | 5/1998 |
| WO | 1999029243 A1 | 6/1999 |
| WO | 1999063900 A1 | 12/1999 |
| WO | 02/39063 A1 | 5/2002 |
| WO | 2003/007370 A1 | 1/2003 |
| WO | 2004110693 A1 | 12/2004 |
| WO | 2005/063645 A1 | 7/2005 |
| WO | 2006/017583 A2 | 2/2006 |
| WO | 2006073098 A1 | 7/2006 |
| WO | 2007094160 A1 | 8/2007 |
| WO | 2007/119740 A1 | 10/2007 |
| WO | 2008/012186 A1 | 1/2008 |
| WO | 2008/049389 A1 | 5/2008 |
| WO | 2008080182 A1 | 7/2008 |
| WO | 2008/102848 A1 | 8/2008 |
| WO | 2008/108332 A1 | 9/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2010035736 A1 | 4/2010 |
| WO | 2010/096359 A1 | 8/2010 |
| WO | 2010111609 A2 | 9/2010 |
| WO | 2010129459 A2 | 11/2010 |
| WO | 2011/025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013/016157 A1 | 1/2013 |
| WO | 2013022148 A1 | 2/2013 |
| WO | 2013043173 A1 | 3/2013 |
| WO | 2013/084877 A1 | 6/2013 |
| WO | 2013/084879 A1 | 6/2013 |
| WO | 2013138802 A1 | 9/2013 |
| WO | 2013150990 A1 | 10/2013 |
| WO | 2013153195 A1 | 10/2013 |
| WO | 2014/010490 A1 | 1/2014 |
| WO | 2014/012125 A1 | 1/2014 |
| WO | 2014028022 A1 | 2/2014 |
| WO | 2014/058663 A1 | 4/2014 |
| WO | 2014/075995 A2 | 5/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014/111385 A1 | 7/2014 |
| WO | 2014111794 A1 | 7/2014 |
| WO | 2014/121261 A1 | 8/2014 |
| WO | 2014/132493 A1 | 9/2014 |
| WO | 2014161534 A2 | 10/2014 |
| WO | 2014161535 A2 | 10/2014 |
| WO | 2015077113 A1 | 5/2015 |
| WO | 2015/094898 A2 | 6/2015 |
| WO | 2015/095014 A1 | 6/2015 |
| WO | 2015/095151 A2 | 6/2015 |
| WO | 2015095088 A1 | 6/2015 |
| WO | 2015095090 A1 | 6/2015 |
| WO | 2015095146 A1 | 6/2015 |
| WO | 2015/114032 A1 | 8/2015 |
| WO | 2015/128833 A1 | 9/2015 |
| WO | 2015/132008 A1 | 9/2015 |
| WO | 2015127583 A1 | 9/2015 |
| WO | 2016/007843 A1 | 1/2016 |
| WO | 2016/010991 A1 | 1/2016 |
| WO | 2016005455 A1 | 1/2016 |
| WO | 2016010954 A2 | 1/2016 |
| WO | 2016/079275 A1 | 5/2016 |
| WO | 2016/089799 A1 | 6/2016 |
| WO | 2016/100954 A1 | 6/2016 |
| WO | 2016154284 A1 | 9/2016 |
| WO | 2017/009149 A1 | 1/2017 |
| WO | 2017/079570 A2 | 5/2017 |
| WO | 2017/091529 A1 | 6/2017 |
| WO | 2017/093393 A1 | 6/2017 |

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning Eagle Amlcd Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

(56) References Cited

OTHER PUBLICATIONS

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Duocastella, M. et al.; Bessel and annular beams for materials processing; Laser & Photonics Reviews; 2012; pp. 607-621; vol. 6, No. 5.

Durnin, J.; Exact solutions for nondiffracting beams. 1. The scalar theory; J. Opt. Soc. Am. A; Apr. 1987; pp. 351-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Veriag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the biillleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Veriag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. Of SPIE; 2014; pp. 896711-1-896711-8; vol. 8967; SPIE.

Wang, Z. et al.; Investigation on $CO_2$ laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

"EagleEtch" Product Brochure, EuropeTec USA Inc., pp. 1-8, Aug. 1, 2014.

"PHAROS High-power femtosecond laser system" product brochure; Light Conversion, Vilnius, LT; Apr. 18, 2011, pp. 1-2.

"TruMicro 5000" Product Manual, Trumpf Laser GmbH + Co. KG, pp. 1-4, Aug. 2011.

"Abramov et al., ""Laser separation of chemically strengthened glass""; Physics Procedia 5 (2010) 285-290, Elsevier.;doi: 10.1016/j.phpro.2010.08.054".

Arimoto et al., "Imaging properties of axicon in a scanning optical system"; Applied Optics, Nov. 1, 1992, vol. 31, No. 31, pp. 6653-6657.

Bhuyan et al., "High aspect ratio nanochannel machining using single shot femtosecond Bessel beams"; Applied Physics Letters 97, 081102 (2010); doi: 10.1063/1.3479419.

Bhuyan et al., "High aspect ratio taper-free microchannel fabrication using femtosecond Bessel beams"; Optics Express (2010) vol. 18, No. 2, pp. 566-574.

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

Girkin et al., "Macroscopic multiphoton biomedical imaging using semiconductor saturable Bragg reflector modelocked Lasers"; Part

(56) References Cited

OTHER PUBLICATIONS of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd. doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Jonas Weiss, et al., "Optical Interconnects for Disaggregated Resources in Future Datacenters", ECOC 2014, Cannes-France, 3 pgs.
Tymon Barwicz, et al., "Assembly of Mechanically Compliant Interfaces between Optical Fibers and Nanophotonic Chips", Tymon Barwicz (IBM), et al., Electronic Components & Technology Conference, 2014,. 978-1799-2407-3, 2014 IEEE, pp. 179-185.
"Aviation Manufacturing Technology"; Beijing Aviation Manufacturing Engineering Research Institute Aviation Industry Press; (2013) p. 147.
"Eagle etch Data Sheet".
Amended claims 1, 2 Amended Claims (Nov. 21, 2018) GMvp4 p. 1.

Analyse of claims 1-11 GMvP7 p. 1.
Betriebsanleitung TruMicro Series 5000, "Ausgabe May 2008 Betriebsanleitung TruMicro Series 5000_Anlage E2a-1.pdf".
Betriebsanleitung; TruMicro 5000; Aug. 2011; pp. 1-4.
Case Design Guidelines for Apple Devices Release R5 (https://web.archive.org/web/20131006050442/https://developer.apple.com/resources/cases/Case-Design-Guidelines.pdf; archived on Oct. 6, 2013).
Case study: Simulation einer Beschneidung des Femfelds eines Bessel-Gauß-Strahls GMvP6 p. 1.
Claim 1—published on Nov. 20, 2019 EP947: Anspruch 1—erteiltam 20. Nov. 2019 GMvp5 p. 1.
Corning Inc., Corning Eagle2000TM AMLCD Glass Substrates Material Information, issued Apr. 2005. (Year: 2005).
D5 Claims GMvP2 p. 1.
D6 Amended claim 1 EP947: Anspruch 1—geandert am 21. Nov. 2018 GMvp3 p. 1.
Design of Diffractivephase Axicon Illuminated by a Gaussian-Profile Beam, Zhangg Uo-Qing, D Ongb I-Zhen,Y Angg Uo-Zhen, and Gu Ben-Yuan, vol. 6, No. 5 Acta Physica Sinica May 1996, pp. 354.
EagleEtch; TheAnti-glare Glass for Technical Display Applications; Glass and Polymer Technologies; pp. 1-8; EuropTec USA Inc.
Eaton et al. "Heat accumulation effects in femtosecond laser written waveguides with variable repetition rates", Opt. Exp. 5280, vol. 14, No. 23 Jun. 2006.
Faccio et al. "Kerr-induced spontaneous Bessel beam formation in the regime of strong two-photon absorption" Optics Express 16(11) 2008, pp. 8213-8218.
Flamm et al., "Higher-order Bessel-like Beams for Optimized Ultrafast Processing of Transparent Materials" GMvP 19.
Flamm et al., "Higher-order Bessel-like Beams for Optimized Ultrafast Processing of Transparent Materials" GMvP 20.
Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.
High aspect ratio machining . . . Anlage E8-1.pdf.
http://www.gtat.com/Collateral/Documents/Engltsh-US/Sapphire/12-21-12_GT_TnuchScreen_ V3_web.pdf.
Korean Patent Application No. 10-2015-7022064 Notice of Allowance of Patent dated Dec. 21, 2020; 3 Pages; (1 page of English Translation and 2 pages of Original Document) Korean Patent Office.
Korean Patent Application No. 10-2016-7019343 Official Notice for Filing Response dated Dec. 17, 2020; 11 Pages; (4 Pages of English Translation and 7 Pages of Original Document) Korean Patent Office.
Louis A. Romero* and Fred M. Dickey, "Theory of optimal beam splitting by phase gratings. I. One-dimensional gratings" J. Opt. Soc. Am., A 24, 2280, (2007).
Merkmalsgliederung Patentanspruch 1 des Streitpatents, "Merkmalsgliederung Patentanspruch 1_Anlage E15-1.pd1".
Merkmalsgliederung Patentanspruch 12 des Streitpatents,"Merkmalsgliederung Patentanspruch 12_Anlage E16-1.pdf".
Norm: DI N EN ISO 11146-2, 2005 DIN EN ISO 11146-2 May 2, 2005 GMvP 21 pages.
Norm: DIN EN ISO 11146-1, 2005 GMvP DIN EN ISO 11146:1999-09 Apr. 1, 2005 GMvP 23 pages.
Norm: ISO/TR 11146-3 , Technical Report First edition GMvP Norm-TR 1 Pages.
Perry, M. et al.; Ultrashort-Pulse Laser Machining; International Congress on Applications of Lasers and Electro-Optics; Orlando, Florida; Nov. 16-19, 1998; pp. 1-24.
Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).
Product Data Sheet for Corning Eagle XG Slim Glass, Issued Aug. 2013; 2 Pages.
Product data sheet for Corning Eagle XR glass substrate, issued Jan. 2006 (Year: 2006).

(56) References Cited

OTHER PUBLICATIONS

Produktbeschreibung Pharos Laser vom Apr. 18, 2011, "Pharos_2011 Anlage E 1 a-1. pdf".

Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).

Sukumaran, "Through-Package-Via Formation and Metallization of Glass Interposers.", Electronic Components and Technology Conference: 557-563, (2010).

Unichains, Engineering Manual: Innovative Belt & Chain solutions for every industry and application, available publically at least as of Jun. 1, 2016 as evidenced at the following hyperlink: https://web.archive.org/web/20160601OOOOOO/http://www.unichains.com/.

Vanagas et al., "Glass Cutting by Femtosecond Pulsed Irradiation", J. Microlith., Microfa., Microsyst., 3(2) 358-363, 2004.

What is the difference between Ra and RMS?; Harrison Electropolishing LP; (http://www.harrisonep.com/electropolishingra.html), Accessed Aug. 8, 2016.

ICNIRP, Infrared Radiation, https://www.icnirp.org/en/frequencies/infrared/index.html#:~:text=Wavelength, accessed Apr. 7, 2021 (Year: 2014).

Liu,Xiuwen, "Graphical Audio-Visual Technology Tips", Apr. 30, 2006, pp. 58-59. (Original Document Only).

Tian e al., "Development status and Prospects of TFT-LCD Substrate Glass Chemical Composition", vol. 29, No. 6, 2010, pp. 1348-1362 (English Abstract Submitted).

Tsai et al. , "Internal modification for cutting transparent glass using femtosecond Bessel beams", Optical Engineering, Soc. of Photo-optical Instrumentation Engineering, Bellingham, vol. 53, May 2014, p. 51503.

Chinese Patent Application No. 201780061955.X, Office Action dated Jun. 15, 2021, 11 pages (English Translation Only), Chinese Patent Office.

Taiwanese Patent Application No. 106134567, Office Action dated Aug. 30, 2021, 3 pages (English Translation Only); Taiwanese Patent Office.

\* cited by examiner

ELECTROCHROMIC COATED GLASS ARTICLES AND METHODS FOR LASER PROCESSING THE SAME

CROSS-REFERENCE TO RELATED APPLICATIONS

This application is a continuation-in-part of U.S. application Ser. No. 14/530,457, filed Oct. 31, 2014, which claims priority to U.S. Provisional Application No. 61/917,092, filed on Dec. 17, 2013, and U.S. Provisional Application No. 62/022,896, filed on Jul. 10, 2014, all of which are incorporated herein by reference in their entireties.

FIELD OF THE DISCLOSURE

The disclosure relates generally to electrochromic coated glass articles and more particularly to methods for laser processing such articles. The disclosure also relates to insulated glass units comprising glass substrates coated with an electrochromic layer.

BACKGROUND

Glass substrates coated with electrochromic films may be useful in a variety of applications, including architectural and automotive applications. For example, electrochromic films may be used to vary light intensity and/or light absorption in a room or vehicle. Insulated glass units (IGUs) can comprise two sheets of glass with a perimeter seal forming a cavity between the glass sheets, which can be filled with an insulated gas such as argon to improve the energy rating of the IGU. In certain applications, one of the glass sheets in the IGU may be coated with an electrochromic layer. Such coated IGUs may additionally include one or more components for applying voltage to the electrochromic layer, e.g., bus bars, thereby providing a tinting effect which may lower the transmission of various wavelengths and/or heat by the IGU.

During the manufacture of IGUs or any other glass articles comprising an electrochromic layer, the electrochromic layer may be applied to the glass after cutting and grinding steps due to the sensitivity of these films to moisture and particles generated during these steps. For instance, exposure of electrochromic films to aqueous coolants used during the grinding process may result in blistering and/or breakdown of the films, thereby inhibiting their functionality and/or aesthetic qualities. As such, for traditional IGU production, a glass sheet is often first cut to the desired IGU shape and size and then coated with the electrochromic film ("cut-and-coat"), rather than coating a large glass substrate with an electrochromic film and then cutting the coated substrate to size ("coat-and-cut").

However, the cut-and-coat process can result in a glass substrate having a significant area that is not coated or is not uniformly coated by the electrochromic layer due to fixturing. For example, the components for positioning and holding the glass substrate in place in the coating apparatus may interfere with the ability to coat the glass substrate edge-to-edge. Additionally, the coat-and-cut process may have reduced manufacturing flexibility, because the fixturing must is specific to each glass substrate shape and/or size and must be adjusted to accommodate different glass shapes and/or sizes. In contrast, a coat-and-cut process can implement a single standard fixturing for a large glass substrate and the glass substrate can be subsequently cut to size (coat-and-cut).

Accordingly, it would be advantageous to provide methods for producing glass substrates coated with an electrochromic film which do not substantially damage the electrochromic film and/or do not result in glass substrates comprising uncoated or non-uniformly coated regions. Additionally, it would be advantageous to provide methods for manufacturing such electrochromic coated glass articles which can exhibit increased manufacturing flexibility and/or reduced manufacturing cost, e.g., methods which can be used to coat a glass substrate having a generic shape and/or size and subsequently cut the glass to a specific shape and/or size for a desired application.

SUMMARY

The disclosure relates, in various embodiments, to glass articles comprising a first surface, an opposing second surface, and an electrochromic coating disposed on at least a portion of the second surface, wherein upon application of voltage to the glass article a first region of a coated portion of the glass substrate has a first visible light transmission that is less than a second visible light transmission of a second region of the coated portion. According to some embodiments, the first region may be tinted and the second region may not be tinted upon application of voltage. In various embodiments, the first and second regions may be separated by a contour comprising a plurality of defect spots or lines, In some embodiments, the defect lines may be linear or curved when viewed orthogonally to the first or second surface. According to additional embodiments, the first and/or second regions may comprise a pattern on the glass article when viewed orthogonally to the first or second surface.

Further disclosed herein are glass articles comprising a first surface, an opposing second surface, and an electrochromic coating disposed on substantially all of the second surface, wherein the electrochromic coating comprises a laser damaged peripheral region proximate at least one edge of the glass article, the laser damaged peripheral region having a width of less than about 10 mm, 1 mm, or 0.1 mm. Insulated glass units comprising such glass articles are further disclosed herein.

In an aspect (1), the disclosure provides an electrochromic glass article comprising: a glass substrate comprising a first surface, an opposing second surface, and one or more edges, wherein at least one or more of the one or more edges comprises a laser-modified edge; an electrochromic coating disposed on at least a portion of the second surface, and comprising at least two electrically discontinuous regions, each having a contour; and wherein the two electrically discontinuous regions are separated by a laser-modified discontinuity line having a width from about 0.1 µm to about 25 µm. In an aspect (2), the disclosure provides the electrochromic glass article of aspect (1), wherein the electrochromic coating comprises tungsten oxide. In an aspect (3), the disclosure provides the electrochromic glass article of aspect (1) or (2), wherein the electrically discontinuous regions are not substantially laser damaged. In an aspect (4), the disclosure provides the electrochromic glass article of any of aspects (1)-(3), wherein the second surface of the glass substrate proximate to the laser-modified discontinuity line is not substantially laser damaged. In an aspect (5), the disclosure provides the electrochromic glass article of aspect (4), wherein the contour of at least one of the at least two electrically discontinuous regions is non-linear. In an aspect (6), the disclosure provides the electrochromic glass article of any of aspects (1)-(5), wherein the laser cut discontinuity is a continuous line formed by a laser with a pulse width from $10^{-10}$ to $10^{-15}$ seconds at FWHM. In an aspect (7), the disclosure provides the electrochromic glass article of any of aspects (1)-(6), wherein the second region comprises a pattern in the first region or the first region comprises a pattern in the second region. In an aspect (8), the disclosure provides the electrochromic glass article of any of aspects (1)-(7), wherein the glass article comprises a glass sheet having a thickness ranging from about 0.1 mm to about 10 mm. In an aspect (9), the disclosure provides the electrochromic glass article of any of aspects (1)-(8), wherein one of the at least two electrically discontinuous regions comprises a region of the second surface proximate to the one or more edges of the glass substrate. In an aspect (10), the disclosure provides the electrochromic glass article of aspect (9), wherein the electrically discontinuous region proximate to the one or more edges of the glass substrate has a width of less than about 0.1 mm. In an aspect (11), the disclosure provides the electrochromic glass article of aspect (9), wherein the he electrically discontinuous region proximate to the one or more edges of the glass substrate comprises about 5% or less of the coated portion of the glass article.

In an aspect (12), the disclosure provides a glass article comprising a first surface, an opposing second surface, and an electrochromic coating disposed on substantially all of the second surface, wherein the electrochromic coating comprises a laser damaged peripheral region proximate at least one edge of the glass article, the laser damaged peripheral region having a width of less than about 0.1 mm. In an aspect (13), the disclosure provides the glass article of aspect (12), wherein the laser damaged peripheral region comprises about 5% or less of the second surface of the glass article. In an aspect (14), the disclosure provides the glass article of aspect (12) or (13), wherein the at least one edge has a linear or curved contour. In an aspect (15), the disclosure provides the glass article of any of aspects (12)-(14), wherein the glass article comprises a glass sheet having a thickness ranging from about 0.1 mm to about 10 mm. In an aspect (16), the disclosure provides the glass article of any of aspects (12)-(15), wherein a coated portion of the second surface comprises a first region and a second region, and wherein upon application of voltage to the glass article the first region has a first visible light transmission that is less than a second visible light transmission of the second region. In an aspect (17), the disclosure provides the glass article of aspect (16), wherein the first and second regions are separated by a discontinuity line comprising one or more laser lines. In an aspect (18), the disclosure provides the glass article of aspect (17), wherein the contour is linear or curved.

In an aspect (19), the disclosure provides an insulated glass unit comprising the electrochromic glass article of any of aspects (1)-(11).

In an aspect (20), the disclosure provides an insulated glass unit comprising the glass article of any of aspect (12)-(18).

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings, wherein, when possible, like numerals refer to like components, it being understood that the appended figures are not necessarily drawn to scale.

DETAILED DESCRIPTION

Methods

Figure 1A:
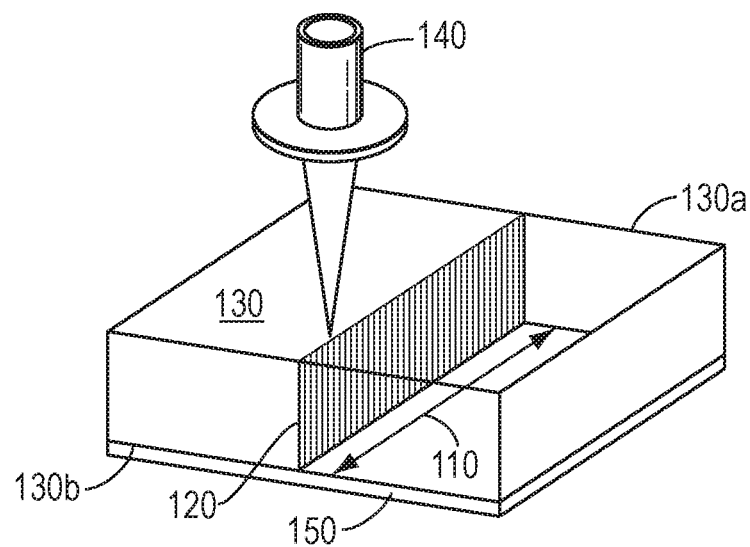
FIGS. 1A-B illustrate a glass substrate with a contour comprising a plurality of defect lines.

The glass articles disclosed herein can be manufactured using one or more methods for creating small (e.g., 100, 10, or 1 micron or smaller) "holes" in the glass for the purpose of drilling, cutting, separating, perforating, or otherwise processing the materials optionally in combination with one or more methods of inducing defects or discontinuities in a electrochromic layer that is coated on the glass. In certain embodiments, an ultrashort (i.e., pulse width from $10^{-10}$ to $10^{-15}$ second FWHM, e.g., nanosecond to femtosecond) pulsed laser beam (operating at wavelengths such as 1064, 532, 355 or 266 nm, for example) can be focused to an energy density above a threshold at which defects can be created in the region of focus at the surface of or within the glass. By repeating the process, a series of laser-induced defects aligned along a predetermined path or contour can be created. In some embodiments, the laser-induced defect lines can be spaced sufficiently close together, such that a controlled region of mechanical weakness within the glass can be created and optionally used to fracture or separate (mechanically or thermally) the material along the defined contour. For example, after contact with the ultrashort pulsed laser, the material may be contacted with a second laser beam, e.g., an infrared laser such as a carbon dioxide ($CO_2$) laser, or other source of thermal stress, to separate the glass into one or more portions.

According to various embodiments, one or more vertical fault or defect spots, series of spots, or lines can be created in a glass substrate, which can delineate a contour or path of least resistance along which the substrate can be separated to define a desired shape, wherein the contour comprises a plurality of defect lines or regions extending from the first surface to the opposing second surface of the glass substrate. The substrate to be processed may be irradiated with an ultrashort pulsed laser beam (e.g., pulse width<100 psec; wavelength≤1064 nm) that may be condensed into a high aspect ratio focal line penetrating all or a portion of the substrate thickness.

Within this volume of high energy density, the substrate may be modified via nonlinear effects, which can be triggered by the high optical intensity. Below this intensity threshold, the substrate may be transparent to the laser radiation and may not be modified to produce defect lines. As used herein, a substrate is "substantially transparent" to the laser wavelength when the substrate absorption is less than about 10%, e.g., less than about 5%, or less than about 1%, per mm of substrate depth at the wavelength of the laser. By scanning the laser over a desired contour or path, one or more narrow defect lines can be created in the substrate and the contour can define a perimeter or shape along which the glass substrate can be separated and/or a tinted or untinted region of the coated substrate.

The ultrashort pulsed laser can create multi-photon absorption ("MPA") in substantially transparent materials such as glass. MPA is the simultaneous absorption of two or more photons of identical or different frequencies in order to excite a molecule from one state, usually the ground state, to a higher energy electronic state. The energy difference between the involved lower and upper states of the molecule is equal to the sum of the energies of the two photons. MPA, also called induced absorption, can be a second or third-order process, for example, that is several orders of magnitude weaker than linear absorption. It differs from linear absorption in that the strength of induced absorption can be proportional to the square of the light intensity, for example, and thus it is a nonlinear optical process.

The pulsed laser beam may have a wavelength chosen from those at which the substrate is substantially transparent, e.g., wavelengths less than or equal to about 1064 nm, such as 532, 355, or 266 nanometers, including all ranges and subranges therebetween. Exemplary power levels for the pulsed laser can range, in some embodiments, from about 10 W to about 150 W, such as from about 25 W to about 125 W, or from about 50 W to about 100 W, including all ranges and subranges therebetween. According to various embodiments, the pulsed laser beam can have a pulse duration of less than 10 nanoseconds, for example about 100 picoseconds. In some embodiments the pulsed laser beam has a pulse duration from greater than about 1 picosecond to less than about 100 picoseconds, e.g., ranging from about 5 picoseconds to about 50 picoseconds, from about 10 picoseconds to about 30 picoseconds, or from about 15 picoseconds to about 20 picoseconds, including all ranges and subranges therebetween. In additional embodiments, the pulse repetition rate of the pulsed laser beam can range from about 1 kHz to about 4 MHz, such as from about 10 kHz to about 650 kHz, from about 50 kHz to about 500 kHz, from about 100 kHz to about 400 kHz, or from about 200 kHz to about 300 kHz, including all ranges and subranges therebetween.

The pulsed laser beam can operate, in some embodiments, in a single pulse mode or, in other embodiments, in burst mode. In the latter embodiments, a pulse burst can comprise two or more pulses, such as, for example, 3, 4, 5, 10, 15, 20, 25, or more pulses per burst, including all ranges and subranges therebetween. A duration between individual pulses in a pulse burst may range, for instance, from about 1 nanosecond to about 50 nanoseconds, such as from about 10 nanoseconds to about 30 nanoseconds, or from about 20 nanoseconds to about 40 nanoseconds, including all ranges and subranges therebetween. A duration between pulse bursts can range, in certain embodiments, from about 1 microsecond to about 20 microseconds, such as from about 5 microseconds to about 10 microseconds, including all ranges and subranges therebetween. Accordingly, a burst repetition frequency of the pulsed laser beam can range from about 1 kHz to about 200 kHz, such as from about 20 kHz to about 150 kHz, or from about 50 kHz to about 100 kHz, including all ranges and subranges therebetween.

In burst mode, an average laser power per burst can range from about 50 µJ/burst to about 1000 µJ/burst, such as from about 100 µJ/burst to about 750 µJ/burst, from about 200 µJ/burst to about 500 µJ/burst, or from about 250 µJ/burst to about 400 µJ/burst, including all ranges and subranges therebetween. According to additional embodiments, the average laser power applied to a given material can be measured as µJ/burst per mm of material and can, for instance, be greater than about 40 µJ/burst per unit thickness (mm) of a given material (e.g., glass), such as ranging from about 40 µJ/burst/mm to about 2500 µJ/burst/mm, from about 100 µJ/burst/mm to about 2000 µJ/burst/mm, from about 250 µJ/burst/mm to about 1500 µJ/burst/mm, or from about 500 µJ/burst/mm to about 1000 µJ/burst/mm, including all ranges and subranges therebetween. For example, a 0.1-0.2 mm thick Corning Eagle XG® glass substrate can be processed using a 200 µJ/burst pulsed laser to give an exemplary laser power of 1000-2000 µJ/burst/mm. In another non-limiting example, a 0.5-0.7 mm thick Corning Eagle XG® glass substrate can be processed using a 400-700 µJ/burst pulsed laser to give an exemplary laser power of 570-1400 µJ/burst/mm.

According to non-limiting embodiments, the glass substrate and pulsed laser beam may be translated relative to each other, e.g., the glass substrate may be translated relative to the pulsed laser beam and/or the pulsed laser beam may be translated relative to the glass substrate, to create a contour. In one specific embodiment, the glass substrate is translated and the pulsed laser is applied thereto while the pulsed laser is itself translated. For example, in roll to roll processing, the glass substrate may be very long, for example tens of meters long or more, and translate substantially continuously during laser processing. The laser is translated at the appropriate speed and along the appropriate vectors to create one or more contours in the glass substrate. Either the substrate or the laser may change their speed during this processing.

The contour can comprise a plurality of defect lines that may trace or define the perimeter of a shape to be created, either by subsequent separation or by subsequent application of voltage (e.g., tinting). The translation or scan speed can depend on various laser processing parameters including, for instance, laser power and/or repetition rate. Exemplary translation or scan speeds can range, for instance, from about 1 mm/s to about 5000 mm/s, such as from about 100 mm/s to about 4000 mm/s, from about 200 mm/s to about 3000 mm/s, from about 300 mm/s to about 2500 mm/s, from about 400 mm/s to about 2000 mm/s, or from about 500 mm/s to about 1000 m/s, including all ranges and subranges therebetween.

The repetition rate and/or scan speed of the pulsed laser beam can be varied to create a desired periodicity (or pitch) between defect lines. In some embodiments, the defect lines may be spaced apart by about 0.5 µm to about 25 µm, such as from about 1 µm to about 20 µm, from about 2 µm to about 15 µm, from about 3 µm to about 12 µm, from about 4 µm to about 10 µm, or from about 5 µm to about 8 µm, including all ranges and subranges therebetween. For example, for a linear cutting (or scan) speed of 300 mm/s, a 3 µm periodicity between defect lines corresponds to a pulsed laser having a burst repetition rate of at least 100 kHz. Similarly, for a scan speed of 600 mm/s, a 3 µm periodicity between defect lines corresponds to a pulsed laser having a burst repetition rate of at least 200 kHz.

Additionally, the dimensions of the defect lines can be affected, for instance, by the laser focusing parameters, such as the length of the laser beam focal line and/or the average spot diameter of the laser beam focal line. The pulsed laser can be used, for example, to create one or more defect lines having a relatively high aspect ratio (length:diameter), such that a very thin, long defect line can be produced that extends, in some embodiments, from the first surface to the opposing second surface of the substrate. Such defect lines can, in principle, be created by a single laser pulse, or additional pulses can be used to increase the affected area (e.g., increased defect line length and/or width).

Figure 1B:
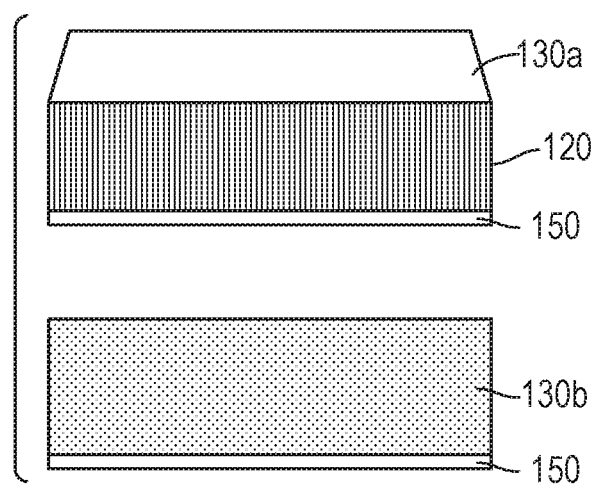

As generally illustrated in FIGS. 1A-B, methods for cutting a glass substrate 130 comprising an electrochromic layer 150 can comprise creating a contour or fault line 110 comprising a plurality of defect lines 120 in the substrate to be processed using a pulsed laser 140. The defect lines 120 may extend, for example, through the thickness of the glass substrate, e.g., approximately orthogonal to the major (flat) surfaces a, b of the glass sheet. While a linear contour, such as the contour 110 illustrated in FIG. 1A, can be created by translating the glass substrate 130 and/or pulsed laser 140 in one dimension, a curved or nonlinear contour can also be created by translating the glass substrate and/or pulsed laser in two dimensions. As shown in FIG. 1B, the glass substrate 130 can then be separated along the contour 110 to produce two separate portions 130a and 130b, wherein the separated edges or surfaces are defined by the contour 110, each portion comprising an electrochromic layer 150.

Figure 2A:
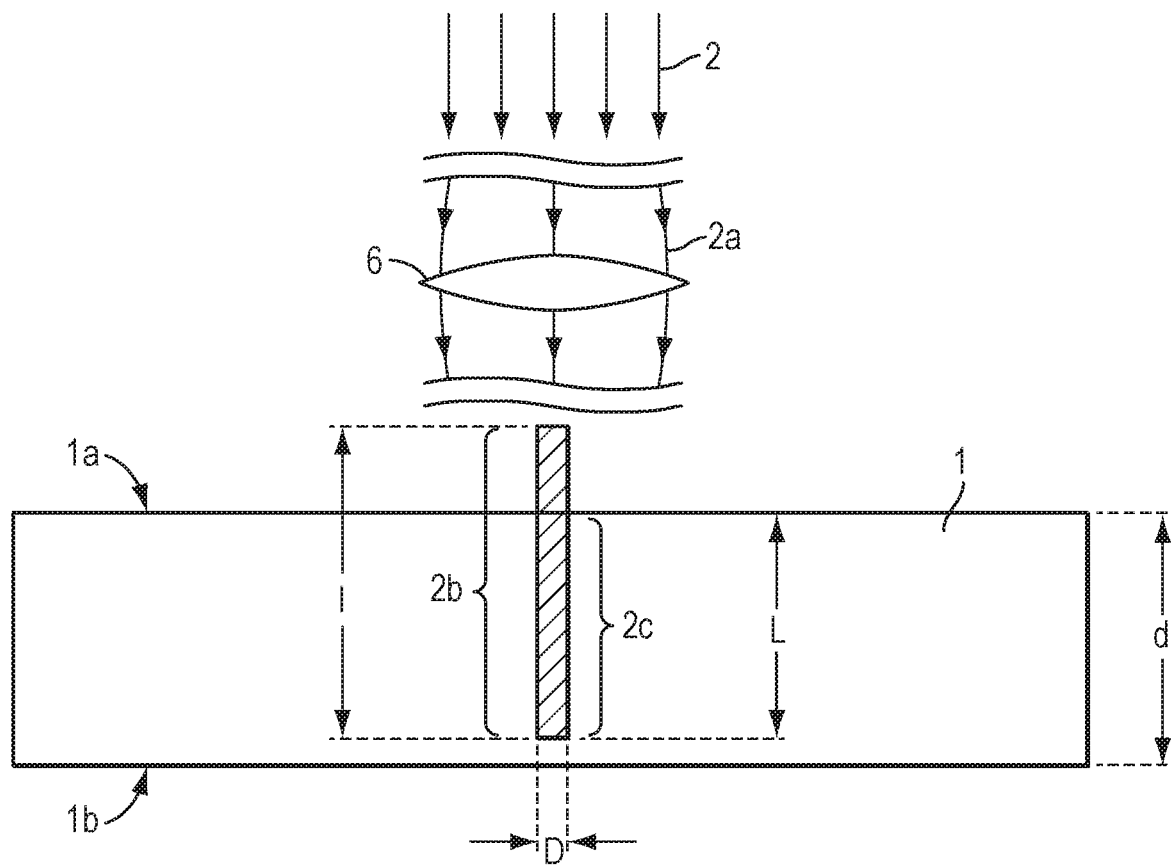
FIGS. 2A-B illustrate the positioning of a laser beam focal line to induce absorption in a glass substrate along the focal line.
Figure 2B:
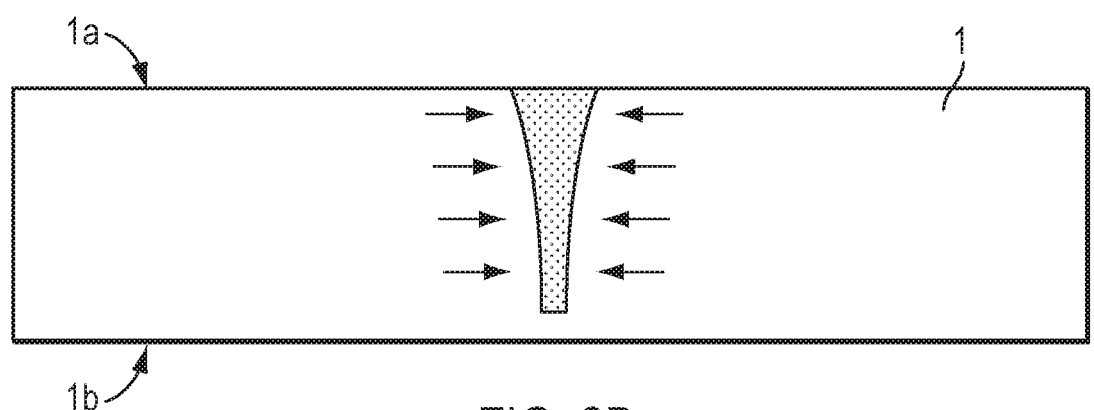

Referring to FIGS. 2A-B, methods for laser processing a substrate can include focusing a pulsed laser beam 2 into a laser beam focal line 2b oriented along the beam propagation direction. A laser (not shown) may emit pulsed laser beam 2, which may have a portion 2a incident to an optical assembly 6. The optical assembly 6 may convert the incident portion 2a of the laser beam into a laser beam focal line 2b along the beam direction, which may have a length L and a diameter D. A substrate 1 may be positioned in the beam path to at least partially overlap with the laser beam focal line 2b, which may thus be directed into the substrate 1. A first surface 1a may be positioned to face the optical assembly 6, whereas an opposing second surface 1b may be positioned to face away from the optical assembly 6, or vice versa. A thickness d of the substrate may extend perpendicularly between surfaces 1a and 1b.

As depicted in FIG. 2A, substrate 1 may be aligned perpendicular to the longitudinal axis of the laser beam and the focal line 2b produced by the optical assembly 6. In various embodiments (as depicted), the focal line 2b may begin before the surface 1a of the substrate 1 and may not extend beyond surface 1b. Of course other focal line orientations can be used, such that the focal line 2b begins after the surface 1a and/or does extend beyond surface 1b (not shown). The area in which the laser beam focal line and substrate overlap may be modified by nonlinear multiphoton or induced absorption of the laser energy, assuming sufficient laser intensity along the laser beam focal line 2b, which intensity can be produced by focusing the laser beam 2 on a section of length l, i.e., a line focus of length l.

The induced absorption can produce defect line formation in the substrate material along section 2c. In some embodiments, the defect line may be a microscopic series of (e.g., 100 nm<diameter<10 μm) "holes" (also called a perforation or defect line). According to various embodiments, individual perforations can be created at rates of several hundred kHz (several hundred thousand perforations per second). By translating the substrate and pulsed laser relative to each other, these perforations can be created adjacent to one another with a desired spatial separation (also referred to as periodicity or pitch). The periodicity of the defect lines can be selected as desired to facilitate separation of the substrate and/or to create a desired tinting effect. Exemplary periodicity between the defect lines can range, for instance, from about 0.5 μm to about 25 μm, such as from about 1 μm to about 20 μm, from about 2 μm to about 15 μm, from about 3 μm to about 12 μm, from about 4 μm to about 10 μm, or from about 5 μm to about 8 μm, including all ranges and subranges therebetween.

In certain non-limiting embodiments, the defect line may be a "through hole" or open channel extending from the first surface 1a to the opposing second surface 1b, e.g., extending across the entire thickness d of the substrate 1. Defect line formation can also extend across a portion of the substrate thickness, as indicated by section 2c having length L in FIG. 2A. The length L of section 2c thus corresponds to the length of the overlap between the laser beam focal line 2b with the substrate 1 and the length of the resulting defect line. The average diameter D of section 2c may correspond more or less to the average diameter of the laser beam focal line 2b. Referring to FIG. 2B, the substrate 1 exposed to the laser beam 2 in FIG. 2A will eventually expand due to induced absorption of the laser energy such that a corresponding induced tension in the material may lead to microcrack formation. The induced tension may be greatest at surface 1a, according to various embodiments.

As defined herein, the width of a defect line corresponds to the internal width of the open channel or diameter air hole produced in the glass substrate. For example, in some embodiments, the width of the defect line may range from about 0.1 μm to about 5 μm, such as from about 0.25 μm to about 4 μm, from about 0.5 μm to about 3.5 μm, from about 1 μm to about 3 μm, or from about 1.5 μm to about 2 μm, including all ranges and subranges therebetween. The width of a defect line can, in some embodiments, be as large as the average spot diameter of the laser beam focal line, e.g., the average spot diameter of the laser beam focal line may also range from about 0.1 μm to about 5 μm, such as from about 0.25 μm to about 4 μm, from about 0.5 μm to about 3.5 μm, from about 1 μm to about 3 μm, or from about 1.5 μm to about 2 μm, including all ranges and subranges therebetween. In embodiments in which the glass substrate is separated along a contour comprising a plurality of defect lines, the defect lines may be potentially viewed along the cut edge(s) of the separated portions, and these regions can have widths comparable to the widths of the defect lines, e.g., from about 0.1 μm to about 5 μm.

The pulsed laser beam can be focused into a laser beam focal line having any desired length l, which can vary, e.g., depending on the selected optical assembly configuration. In some embodiments, the laser beam focal line length can range, for example, from about 0.01 mm to about 100 mm, such as from about 0.1 mm to about 50 mm, from about 0.5 mm to about 20 mm, from about 1 mm to about 10 mm, from about 2 mm to about 8 mm, or from about 3 mm to about 5 mm, including all ranges and subranges therebetween. In various embodiments, the laser beam focal line length l can correspond to the thickness d of the substrate, can be less than the thickness d, or can be greater than the thickness d of the substrate. As such, in some embodiments, the methods disclosed herein can be used to process or cut more than one substrate, such as a stack of two or more substrates. According to non-limiting embodiments, the pulsed laser beam can perforate a stack of glass substrates up to a total thickness of about 100 mm or greater, e.g., from 20 µm to about 200 mm, with a single laser pass, even in instances where one or more air gaps exist between the substrates in various locations. For example, each substrate of a stack of 200 substrates, each substrate being 0.5 mm thick, may be perforated by a single pass of the laser. For example, each substrate having an electrochromic film approximately 1 micron (0.001 mm) thick, would make a stack of 200 such substrates 100.2 mm thick (100 mm of glass and 0.2 mm of electrochromic film). Additionally, some embodiments may further comprise additional coatings and/or protective materials between the glass substrates that are optically clear and allow the perforation of multiple layers. Such coatings include, but are not limited to, $SiO_2$, $Al_2O_3$, and organic and inorganic polymers, such as siloxanes.

The defect line or plurality of defect lines can be created using various methods. For example, various devices can be used to focus a laser beam to create a laser beam focal line. A laser beam focal line may be generated, for example, by transmitting a Gaussian laser beam into an axicon lens to create a Gauss-Bessel laser beam profile. A Gauss-Bessel beam may diffract more slowly than a Gaussian beam (e.g., may maintain single micron spot sizes for ranges of hundreds of microns or millimeters as oppose to a few tens of microns or less). The depth or length of focus intensity for a Gauss-Bessel beam may thus be much larger than that of a Gaussian beam. Other slowly diffracting or non-diffracting beams may also be used or created using optical elements, such as Airy and Bessel beams. Exemplary optical assemblies for generating a laser beam focus line are provided in U.S. patent application Ser. Nos. 14/529,520 and 14/530,457, which are incorporated by reference herein in their entireties. Focusing can be carried out, e.g., using any variety of donut-shaped laser beams, spherical lenses, axicon lenses, diffractive elements, or any other suitable method or apparatus to form a linear region of high intensity. The type of pulsed laser (e.g., picosecond, femtosecond, etc.) and/or its wavelength (e.g., IR, UV, green, etc.) can also be varied, so long as sufficient intensity is created to create breakdown of the substrate material due to nonlinear optical effects.

Figure 3:
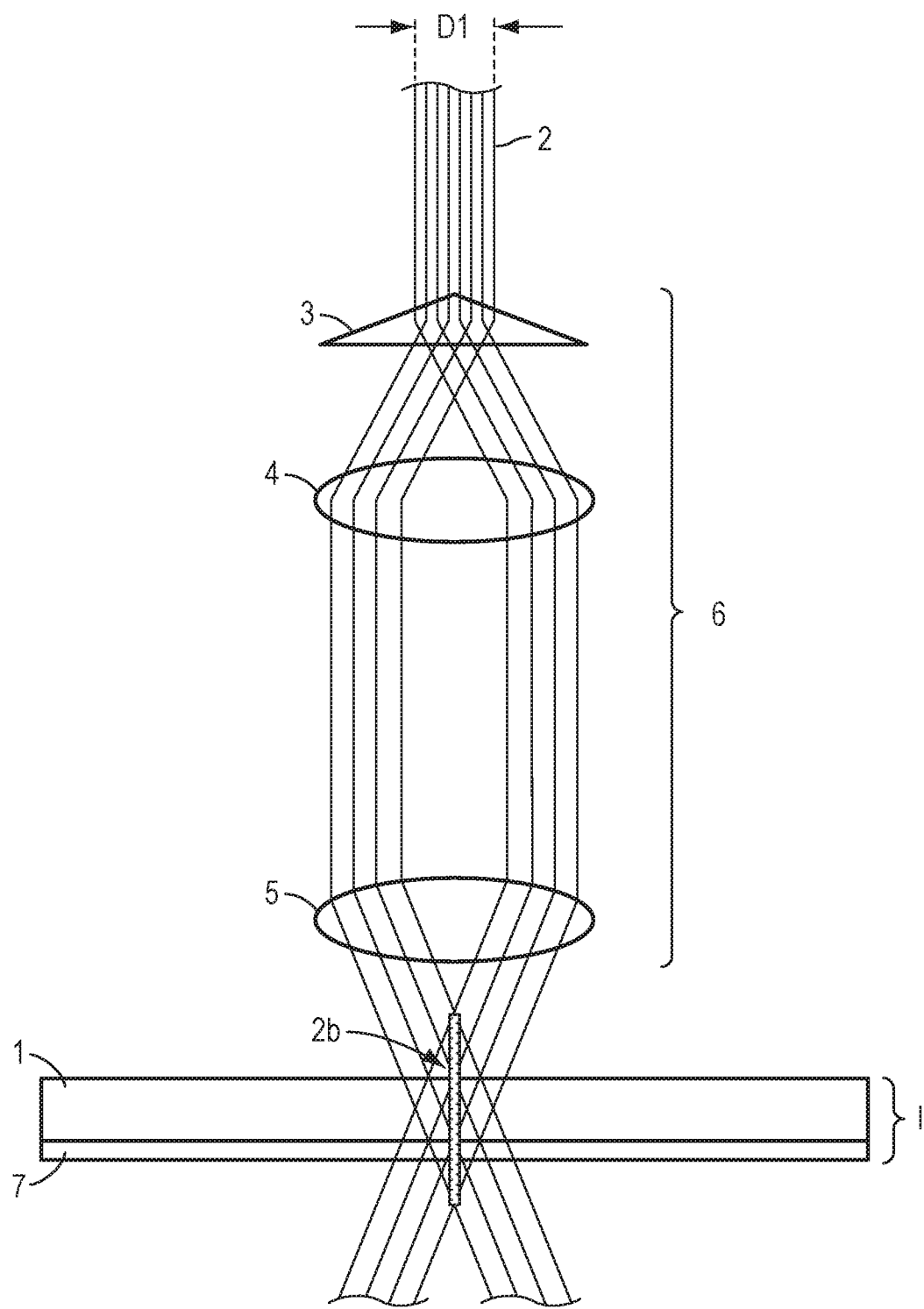
FIG. 3 illustrates an optical assembly for focusing a laser beam into a laser beam focal line according to various embodiments of the disclosure.

FIG. 3 illustrates one exemplary optical assembly 6 that can be used to focus a pulsed laser beam 2 into a laser beam focal line 2b having length l and directed into a glass substrate 1 having an electrochromic layer 7. The optical assembly 6 can include, for example, an axicon lens 3, a collimating lens 4, and a focusing lens 5. The focal length of each lens in the optical assembly can be varied to produce a laser beam focal line having a desired diameter and/or length. For example, the focusing lens 5 can have a focal length ranging from about 10 mm to about 50 mm, such as from about 20 mm to about 40 mm, or from about 25 mm to about 30 mm, including all ranges and subranges therebetween. The collimating lens 4 may similarly have a focal length that ranges from about 50 mm to about 200 mm, such as from about 75 mm to about 150 mm, or from about 100 mm to about 125 mm, including all ranges and subranges therebetween.

In various non-limiting embodiments, an axicon lens 3 may be incorporated into the optical lens assembly 6 to create a high intensity region of high aspect ratio, e.g., taper-free laser microchannels, using ultrashort Bessel beams (of picosecond or femtosecond duration). An axicon is a conically cut lens capable of forming a spot source on a line along the optical axis (e.g., transforming a laser beam into a ring). Axicons and their configurations are known to those skilled in the art and may, for example, have cone angles ranging from about 5° to about 20°, such as from about 10° to about 15°, including all ranges and subranges therebetween.

The axicon lens 3 can condense the laser beam having an original diameter D1 (e.g., about 1-5 mm, such as about 2-3 mm) into a high intensity region of substantially cylindrical shape and high aspect ratio (e.g., long length and small diameter) with a smaller diameter corresponding, e.g., to the focal line diameter D illustrated in FIG. 2A. The high intensity created within the condensed laser beam can result in a nonlinear interaction of the electromagnetic field of the laser and the substrate such that the laser energy is transferred to the substrate to effect formation of defect lines. However, in areas of the substrate where the laser intensity is not sufficiently high (e.g., the areas surrounding the central convergence line), the substrate may be transparent to the laser such that there is no mechanism for transferring energy from the laser to the substrate material. As such, there may be no damage or change in the areas of the glass substrate which are exposed to laser intensity below the nonlinear threshold.

After creating a contour comprising a plurality of defect lines or perforations using the pulsed laser beam, the glass substrate can optionally be separated into two or more portions using a second laser beam. The second laser beam may be used as a heat source to create a thermal stress zone around the contour, which may put the defect lines in tension thereby inducing separation. The second laser beam can emit any wavelength at which the glass substrate is not transparent, such as infrared wavelengths, e.g., greater than about 1064 nm. In some embodiments, the second laser beam can emit at wavelengths greater than about 5 µm, such as greater than about 10 µm. Suitable infrared lasers may include, for example, $CO_2$ lasers and the like, which may be modulated or unmodulated. A non-limiting example of a second laser beam includes, but is not limited to, a modulated $CO_2$ laser operating at a wavelength greater than about 10 µm, such as about 10.2 µm to about 10.7 µm, or from about 10.4 µm to about 10.6 µm, including all ranges and subranges therebetween.

With reference to FIGS. 1A-B, the second laser beam (not shown) can be contacted with the first surface a of the glass substrate 130 and translated along the contour 110 to separate the glass substrate into two or more portions 130a, 130b. The second surface b can comprise an electrochromic layer 150, which faces away from the surface a that is in contact with the second laser beam. The second laser beam can create a region of thermal stress on and around the contour 110, thus inducing separation of the glass substrate 130 along the contour 110 to create separate portions 130a, 130b.

Exemplary power levels for the second laser beam can range, in some embodiments, from about 50 W to about 500 W, such as from about 100 W to about 400 W, from about 150 W to about 300 W, or from about 200 W to about 250 W, including all ranges and subranges therebetween. When operated in continuous (e.g., unmodulated) mode, the second laser beam may have a lower power than when operated in modulated mode. For instance, a continuous second laser beam may have a power level ranging from about 50 W to about 300 W, whereas a modulated second laser beam may have a power level ranging from about 200 W to about 500 W, although the respective laser powers can vary and are not limited to the given exemplary ranges. In additional embodiments, the average spot diameter of the second laser beam can range from about 1 mm to about 10 mm, such as from about 2 mm to about 9 mm, from about 3 mm to about 8 mm, from about 4 mm to about 7 mm, or from about 5 mm to about 6 mm, including all ranges and subranges therebetween. The heat generated by the second laser beam can result in a thermal stress region on and/or around the contour, this region having a diameter on the order of microns, e.g., less than about 20 µm, such as ranging from about 1 µm to about 20 µm, from about 2 µm to about 15 µm, from about 3 µm to about 10 µm, from about 4 µm to about 8 µm, or from about 5 µm to about 6 µm, including all ranges and subranges therebetween.

According to various embodiments, the second laser beam may be modulated and can have a pulse duration of less than about 200 microseconds, such as greater than about 1 microsecond to less than about 200 microseconds, e.g., ranging from about 5 microseconds to about 150 microseconds, from about 10 microseconds to about 100 microseconds, from about 20 microseconds to about 80 microseconds, from about 30 microseconds to about 60 microseconds, or from about 40 microseconds to about 50 microseconds, including all ranges and subranges therebetween. According to various embodiments, a rise time of the modulated second laser beam can be less than about 150 microseconds, such as ranging from about 10 microseconds to about 150 microseconds, from about 20 microseconds to about 100 microseconds, from about 30 microseconds to about 80 microseconds, from about 40 microseconds to about 70 microseconds, or from about 50 microseconds to about 60 microseconds, including all ranges and subranges therebetween.

In additional embodiments, the pulse repetition rate (or modulation speed) of the modulated second laser beam can range from about 1 kHz to about 100 kHz, such as from about 5 kHz to about 80 kHz, from about 10 kHz to about 60 kHz, from about 20 kHz to about 50 kHz, or from about 30 kHz to about 40 kHz, including all ranges and subranges therebetween. According to non-limiting embodiments, the pitch or periodicity between the second laser beam pulses can range from about 1 µm to about 100 µm, such as from about 5 µm to about 90 µm, from about 10 µm to about 80 µm, from about 20 µm to about 70 µm, from about 30 µm to about 60 µm, or from about 40 µm to about 50 µm, including all ranges and subranges therebetween.

In certain embodiments, the first surface of the glass substrate can be contacted with the second laser beam in a single pass or, in other embodiments, multiple passes can be made. For example, the second laser beam can be translated relative to the glass substrate, or vice versa, using anywhere from 1 to 10 passes, such as 2 to 9 passes, 3 to 8 passes, 4 to 7 passes, or 5 to 6 passes, including all ranges and subranges therebetween. The translation speed can range from about 100 mm/s to about 1000 mm/s, such as from about 150 mm/s to about 900 mm/s, from about 200 mm/s to about 800 mm/s, from about 250 mm/s to about 700 mm/s, from about 300 mm/s to about 600 mm/s, or from about 400 mm/s to about 500 mm/s, including all ranges and subranges therebetween.

Another aspect comprises use of any of the processes above to create holes, voids, gaps, or other discontinuities in the electrochromic layer on a substrate while either not damaging or limiting damage to the underlying substrate. In such embodiments, the electrochromic layer 150 can be used to modify laser absorption or penetration depth. In some embodiments, the electrochromic layer 150 is placed in a colored or darkened state to increase its absorption of the laser light, and in such embodiments, the laser may be tuned to a wavelength that is close to the light absorption wavelength of the electrochromic layer 150. In such embodiments, the absorption of the electrochromic layer may aid in modification of the electrochromic layer, may impact laser penetration depth, or may increase or decrease the overall laser pulse power needed to modify the glass or electrochromic layer.

In creating discontinuities in the electrochromic layer, it is generally the case that the goal is to create two or more electrically separated regions. Therefore, a discontinuity line, defined as a laser-formed line expressly formed to electrically isolate two or more regions of an electrochromic layer on a substrate, typically needs to be continuous, meaning that it completely disconnects the two regions of the electrochromic layer from each other, and may require ablation of at least one layer of the electrochromic film. The laser power or energy levels needed to create the discontinuities in the electrochromic layer are typically much less than needed to create damage in the glass substrate. Either pulsed or continuous lasers can be used. Use of pulsed lasers can be advantageous in that the electrochromic material can be ablated without heating the electrochromic or substrate, avoiding damaging the adjacent, retained electrochromic materials or the temper of the glass substrate. Further, the wavelength of the laser can advantageously be targeted to the absorption of the electrochromic film, either in its lightened or darkened state. Further the beam can be focused through the substrate or opposite the substrate, depending on needs.

If pulsed, exemplary laser powers can range, in some embodiments, from about 0.25 W to about 150 W, such as from about 0.25 W to about 50 W, or from about 1 W to about 100 W, including all ranges and subranges therebetween. According to various embodiments, the pulsed laser beam can have a pulse duration from 100 nanosecond to 10 femtoseconds, for example about 100 picoseconds. In some embodiments the pulsed laser beam has a pulse duration from greater than about 1 picosecond to less than about 100 picoseconds, e.g., ranging from about 5 picoseconds to about 50 picoseconds, from about 10 picoseconds to about 30 picoseconds, or from about 15 picoseconds to about 20 picoseconds, including all ranges and subranges therebetween. In additional embodiments, the pulse repetition rate of the pulsed laser beam can range from about 1 kHz to about 4 MHz, such as from about 10 kHz to about 650 kHz, from about 50 kHz to about 500 kHz, from about 100 kHz to about 400 kHz, or from about 200 kHz to about 300 kHz, including all ranges and subranges therebetween.

Because the power levels for discontinuity creation in the electrochromic are much less, a continuous laser source can be used as well. Power levels for continuous lasers are from about 0.25 W to about 150 W, such as from about 0.25 W to about 50 W, or from about 1 W to about 100 W, including all ranges and subranges therebetween, primarily depending on wavelength, focus, and time the beam is targeted to a particular region.

The discontinuity line can be approximately the same width as the laser used to make it. The width of the discontinuity line may range from about 0.1 µm to about 5 µm, such as from about 0.25 µm to about 4 µm, from about 0.5 µm to about 3.5 µm, from about 1 µm to about 3 µm, or from about 1.5 µm to about 2 µm, including all ranges and subranges therebetween. The width of a discontinuity line can, in some embodiments, be as large as the average spot diameter of the laser beam focal line, e.g., the average spot diameter of the laser beam focal line may also range from about 0.1 µm to about 5 µm, such as from about 0.25 µm to about 4 µm, from about 0.5 µm to about 3.5 µm, from about 1 μm to about 3 μm, or from about 1.5 μm to about 2 μm, including all ranges and subranges therebetween.

Glass Articles

Figure 4A:
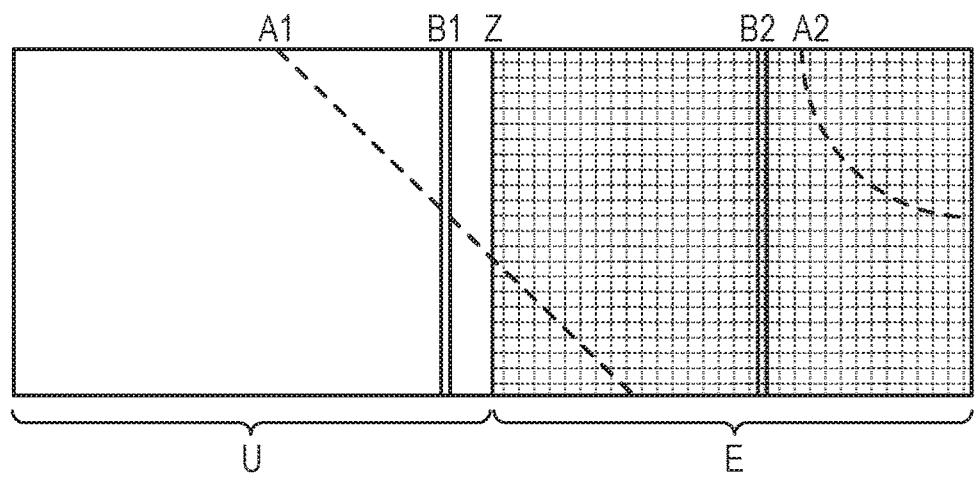
FIGS. 4A-C illustrate a glass substrate comprising electrochromic coated and uncoated regions according to certain embodiments of the disclosure.

Disclosed herein are glass articles comprising a first surface, an opposing second surface, and an electrochromic coating disposed on at least a portion of the second surface, wherein upon application of voltage to the glass article a first region of a coated portion of the glass substrate has a first visible light transmission that is less than a second visible light transmission of a second region of the coated portion. Referring to FIG. 4A, the second surface of a glass article is illustrated, comprising an electrochromic layer on a portion E of the surface (shaded portion) and an uncoated portion U (not shaded) separated by line Z. According to various embodiments, the methods disclosed herein can be used to laser process the glass article of FIG. 4A to produce the glass articles of FIGS. 4B-C, as well as any desired variations thereof.

In some embodiments, the electrochromic layer comprises one or more inorganic materials. In some embodiments, the electrochromic layer comprises one or more tungsten oxides.

Figure 4B:
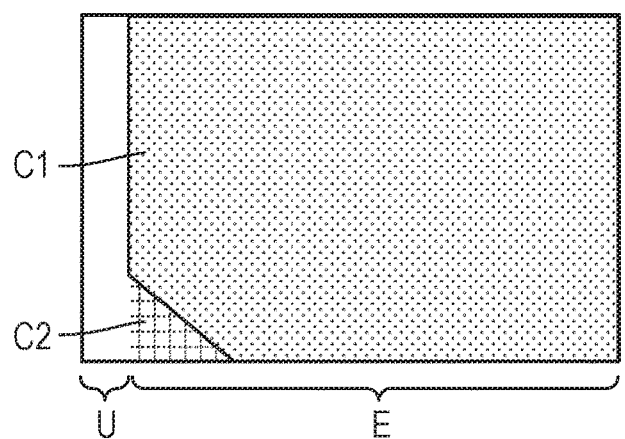
Figure 4C:
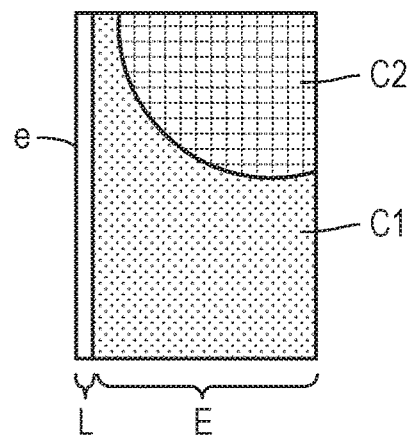

For example, a first pulsed laser can be used to create a contour A1 (dashed line), also referred to herein as a laser "scribe" or "perforation." A first pulsed laser and a second laser can be traced along contour B1 (double line) to separate the glass into two portions to produce the glass article depicted in FIG. 4B as well as an uncoated remainder (not shown). Upon application of voltage to C1, C1 of the coated portion E may be "tinted" and/or may have a reduced transmission (e.g., for visible wavelengths 400-700 nm) as compared to a second region C2 of the coated portion E, which may remain inactivated and unchanged (or untinted). Alternatively, if a voltage is applied to C2 and not C1, it may perform similarly to C1 above. Both C1 and C2 are now capable of tinting independent of each other as the scribe line has electrically disconnected the layers from each other.

The laser scribe along contour A1 serves to create a electrical barrier to the electrochromic effect between C1 and C2. As such, the glass article can comprise uncoated (e.g., untinted) portion U and a "new" untinted (but coated) region C2 which will not exhibit an electrochromic effect upon application of voltage to C1 even though it is coated with the electrochromic layer (and vice versa). The laser scribe or perforation process can thus be used to produce any desired pattern on a glass substrate including linear and curved contours, as well as patterns within the first or second regions. The contour or laser scribe can comprise a plurality of discontinuity lines as discussed above and can separate the respective regions to produce any desired visual effect without significantly damaging the electrochromic layer or the glass substrate. The width of the discontinuity line may range from about 0.1 μm to about 25 μm, such as from about 0.25 μm to about 10 μm, from about 0.5 μm to about 5 μm, from about 1 μm to about 3 μm, or from about 1.5 μm to about 2 μm, including all ranges and subranges therebetween.

In some embodiments, C2 may not, or may not substantially be, laser damaged. For instance, the electrochromic coating and/or glass substrate in this region may not be laser damaged or may exhibit a very small region of laser damage along the contour, as described in more detail below. Therefore, in certain embodiments, the contour produces two or more active devices from a single motherboard. Since the laser cuts are precise and the power can be controlled to produce very fine lines with little damage to the electrochromic film, the electrochromic layers in C1 and C2 are not damaged and very little electrochromic material is wasted.

In some embodiments, the formation of discontinuities in the electrochromic film can be used to eliminate the tinting effect in certain regions of the article. Current methods for eliminating a tinting effect in a given region of a coated substrate involve removing the coating, e.g., using laser ablation to "burn" off the coating in a desired area. However, such processes can be imprecise and can result in a large region of damage to both the electrochromic layer and underlying glass substrate. For example, to ensure that the electrochromic layer is completely removed from the desired region, several passes may be made using a high power laser, which can result in a wide region (or strip) along which the remaining electrochromic layer is damaged and/or the underlying glass substrate is damaged. Such laser damage regions can have a width on the order of tens of millimeters, such as greater than about 20 mm, greater than about 25 mm, or even greater than about 30 mm.

Further disclosed herein are glass articles comprising a first surface, an opposing second surface, and an electrochromic coating disposed on substantially all of the second surface, wherein the electrochromic coating comprises a laser damaged peripheral region proximate at least one edge of the glass article, the laser damaged peripheral region having a width of less than about 10, 1, or 0.1 mm. Referring again to FIG. 4A, a first pulsed laser can be used to create contour A2 (dashed line), and a first pulsed laser and a second laser can be traced along contour B2 (double line) to separate the glass into two portions to produce the glass article depicted in FIG. 4C. Upon application of voltage, a first region C1 of the coated portion E may become tinted and/or may have a reduced transmission (e.g., for visible wavelengths 400-700 nm) as compared to a second region C2 of the coated portion E, which may remain unchanged (or untinted).

Unlike contour B1 which cuts through the uncoated portion U, contour B2 cuts through the coated region E. Without wishing to be bound by theory, it is believed that the laser cutting methods disclosed herein can separate the coated glass article with minimal damage to the electrochromic layer. The laser processing methods disclosed herein may result in a relatively small region (the contour width) in which the electrochromic film is laser damaged and will not exhibit an electrochromic effect upon application of voltage. For example, the laser cutting process can create a laser damage zone L along the cut edge e that is relatively thin (e.g., less than about 0.1 mm). In some embodiments, the laser damage zone L can have a width that is less than about 10 mm, 1 mm, or 0.1 mm, such as less than about 9 mm, 8 mm, 5 mm, 1 mm, 0.5 mm, 0.1 mm, 0.09 mm, 0.08 mm, 0.07 mm, 0.06 mm, 0.05 mm, 0.04 mm, 0.03 mm, 0.02 mm, 0.01 mm, or less, e.g., ranging from about 0.01 mm to about 0.1 mm, including all ranges and subranges therebetween.

The glass articles disclosed herein can have a laser damage region that is relatively small compared to uncoated and/or damaged regions produced by comparative processes. For instance, the cut-and-coat process may result in significant areas that are uncoated due to interference from fixturing. Similarly, if the glass were coated then cut using traditional aqueous edge grinding methods, the damage to the electrochromic layer proximate the cut edge (e.g., blistering, etc.) would be far greater. Furthermore, if it is desired to eliminate the tinting effect on any portion of such substrates (either cut-and-coat or coat-and-cut) using prior art methods, the laser damage region produced during the ablation process would be much larger (e.g., 20 mm or greater in width).

The glass articles herein can comprise at least one surface that is substantially coated with a functional electrochromic layer, e.g., tinted edge-to-edge upon application of voltage, which was not previously possible using prior art methods. In certain embodiments, substantially all of a surface of the glass article may be coated with an electrochromic layer, which can comprise one or more laser damage regions (<0.1 mm) along one or more edges of the article. For example, a surface of a glass substrate may be coated with an electrochromic layer and then the coated substrate may be separated along a single contour to remove any uncoated portions of the glass substrate (e.g., due to fixturing). The resulting glass article may thus be substantially coated with the electrochromic layer and can comprise a peripheral laser damaged region near the contour edge. In additional embodiments, the coated glass substrate can be separated along more than one contour and the resulting glass article can comprise more than one laser damaged region. Upon application of voltage, an edge-to-edge tinting effect may be observed, except for any laser damaged region at the edges. However, such laser damaged regions may be relatively small in comparison to the uncoated and/or damaged regions produced by prior art processes. According to various embodiments, the laser damaged region may comprise less than about 5% of the coated portion of the glass surface, such as less than about 4%, 3%, 2%, 1%, 0.5%, 0.1%, or 0.01%, including all ranges and subranges therebetween, although as the size of the glass article decreases, the relative percentage of the surface occupied by the laser damaged region can increase.

The glass articles disclosed herein can comprise any glass known in the art that is suitable for automotive, architectural, and other similar applications. Exemplary glass substrates can include, but are not limited to, aluminosilicate, alkali-aluminosilicate, borosilicate, alkali-borosilicate, aluminoborosilicate, alkali-aluminoborosilicate, soda lime silicate, and other suitable glasses. In certain embodiments, the substrate may have a thickness ranging from about 0.1 mm to about 10 mm, such as from about 0.3 mm to about 5 mm, from about 0.5 mm to about 3 mm, or from about 1 mm to about 2 mm, including all ranges and subranges therebetween. Non-limiting examples of commercially available glasses suitable for use as a light filter include, for instance, EAGLE XG®, Iris™, Lotus™, Willow®, Gorilla®, HPFS®, and ULE® glasses from Corning Incorporated. Suitable glasses are disclosed, for example, in U.S. Pat. Nos. 4,483,700, 5,674,790, and 7,666,511, which are incorporated herein by reference in their entireties, which are incorporated herein by reference in their entireties.

The substrate can comprise a glass sheet having a first surface and an opposing second surface. The surfaces may, in certain embodiments, be planar or substantially planar, e.g., substantially flat and/or level. The substrate can also, in some embodiments, be curved about at least one radius of curvature, e.g., a three-dimensional substrate, such as a convex or concave substrate. The first and second surfaces may, in various embodiments, be parallel or substantially parallel. The substrate may further comprise at least one edge, for instance, at least two edges, at least three edges, or at least four edges. By way of a non-limiting example, the substrate may comprise a rectangular or square sheet having four edges, although other shapes and configurations are envisioned and are intended to fall within the scope of the disclosure. The laser cutting methods disclosed herein can also be used to create a variety of curved contours and resulting glass articles with curved, e.g., nonlinear edges.

The glass articles disclosed herein can be used to produce various products, such as insulated glass units (IGUs). For example, a glass article comprising at least a portion of a surface coated with an electrochromic layer can be sealed around the perimeter to a second glass sheet to produce an IGU. Because the glass article can be cut to size and/or shape after coating with the electrochromic layer, the manufacture of such IGUs may have improved flexibility and/or reduced cost.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a laser" includes examples having two or more such lasers unless the context clearly indicates otherwise. Likewise, a "plurality" is intended to denote "more than one." As such, a "plurality of defect lines" includes two or more such defect lines, such as three or more such defect lines, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an article that comprises A+B+C include embodiments where an article consists of A+B+C and embodiments where an article consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An electrochromic glass article comprising:
   a glass substrate comprising a first surface, an opposing second surface, and one or more edges, wherein at least one or more of the one or more edges comprises a laser-cut edge; and
   an electrochromic coating disposed on at least a portion of the second surface, and comprising at least two electrically discontinuous regions, each having a contour,
   wherein the two electrically discontinuous regions are separated by a laser-modified discontinuity line having a width from 0.1 µm to 25 µm,
   wherein the electrochromic coating comprises a laser damaged peripheral region directly adjacent to the laser-cut edge, the laser-damaged peripheral region having a width of less than 0.1 mm, and
   wherein the contour of at least one of the at least two electrically discontinuous regions is non-linear.

2. The electrochromic glass article of claim 1, wherein the electrochromic coating comprises tungsten oxide.

3. The electrochromic glass article of claim 1, wherein the electrically discontinuous regions are not substantially laser damaged.

4. The electrochromic glass article of claim 1, wherein the second surface of the glass substrate proximate to the laser-modified discontinuity line is not substantially laser damaged.

5. The electrochromic glass article of claim 1, wherein the laser cut discontinuity is a continuous line formed by a laser with a pulse width from $10^{-10}$ to $10^{-15}$ seconds at FWHM.

6. The electrochromic glass article of claim 1, wherein the second region comprises a pattern in the first region or the first region comprises a pattern in the second region.

7. The electrochromic glass article of claim 1, wherein the glass article comprises a glass sheet having a thickness ranging from 0.1 mm to 10 mm.

8. The electrochromic glass article of claim 1, wherein one of the at least two electrically discontinuous regions comprises a region of the second surface proximate to the one or more edges of the glass substrate.

9. The glass article of claim 8, wherein the electrically discontinuous region proximate to the one or more edges of the glass substrate has a width of less than 0.1 mm.

10. The glass article of claim 8, wherein the electrically discontinuous region proximate to the one or more edges of the glass substrate comprises 5% or less of the coated portion of the glass article.

11. An insulated glass unit comprising the electrochromic glass article of claim 1.

12. An electrochromic glass article comprising:
    a glass substrate comprising a first surface, an opposing second surface, and one or more edges, wherein at least one or more of the one or more edges comprises a laser-cut edge; and
    an electrochromic coating disposed on at least a portion of the second surface, and comprising at least two electrically discontinuous regions, each having a contour,
    wherein the two electrically discontinuous regions are separated by a laser-modified discontinuity line having a width from 0.1 µm to 25 µm,
    wherein the electrochromic coating comprises a laser damaged peripheral region directly adjacent to the laser-cut edge, the laser-damaged peripheral region having a width of less than 0.1 mm, and
    wherein the second region comprises a pattern in the first region or the first region comprises a pattern in the second region.

13. The electrochromic glass article of claim 12, wherein the electrochromic coating comprises tungsten oxide.

14. The electrochromic glass article of claim 12, wherein the electrically discontinuous regions are not substantially laser damaged.

15. The electrochromic glass article of claim 12, wherein the second surface of the glass substrate proximate to the laser-modified discontinuity line is not substantially laser damaged.

16. The electrochromic glass article of claim 12, wherein the laser cut discontinuity is a continuous line formed by a laser with a pulse width from $10^{-10}$ to $10^{-15}$ seconds at FWHM.

17. The electrochromic glass article of claim 12, wherein the second region comprises a pattern in the first region or the first region comprises a pattern in the second region.

18. The electrochromic glass article of claim 12, wherein the glass article comprises a glass sheet having a thickness ranging from 0.1 mm to 10 mm.

19. The electrochromic glass article of claim 12, wherein one of the at least two electrically discontinuous regions comprises a region of the second surface proximate to the one or more edges of the glass substrate.

20. The glass article of claim 19, wherein the electrically discontinuous region proximate to the one or more edges of the glass substrate has a width of less than 0.1 mm.

21. The glass article of claim 19, wherein the electrically discontinuous region proximate to the one or more edges of the glass substrate comprises 5% or less of the coated portion of the glass article.

* * * * *

UNITED STATES PATENT AND TRADEMARK OFFICE
CERTIFICATE OF CORRECTION

PATENT NO. : 11,556,039 B2
APPLICATION NO. : 15/288071
DATED : January 17, 2023
INVENTOR(S) : Moussa N'Gom et al.

It is certified that error appears in the above-identified patent and that said Letters Patent is hereby corrected as shown below:

On the Title Page

On the page 9, in Column 1, under "Other Publications", Line 7, delete "1." and insert -- I. --.

On the page 9, in Column 1, under "Other Publications", Line 8, delete "351" and insert -- 651 --.

On the page 9, in Column 1, under "Other Publications", Line 29, delete "Springer-Veriag." and insert -- Springer-Verlag. --.

On the page 9, in Column 1, under "Other Publications", Line 58, delete "biillleness" and insert -- brittleness --.

On the page 9, in Column 1, under "Other Publications", Line 67, delete "Springer-Veriag." and insert -- Springer-Verlag. --.

On the page 9, in Column 2, under "Other Publications", Lines 26-27, delete "Eelectropolishing;" and insert -- Electropolishing; --.

On the page 9, in Column 2, under "Other Publications", Line 41, delete ""EagleEtch"" and insert -- "EagleTech" --.

On the page 9, in Column 2, under "Other Publications", Line 41, delete "EuropeTec" and insert -- EuropTec --.

On the page 10, in Column 1, under "Other Publications", Line 20, delete "pluse" and insert -- pulse --.

On the page 10, in Column 2, under "Other Publications", Line 18, delete "Diffractivephase" and insert -- Diffractive phase --.

Signed and Sealed this
First Day of August, 2023

Katherine Kelly Vidal
*Director of the United States Patent and Trademark Office*

CERTIFICATE OF CORRECTION (continued)
U.S. Pat. No. 11,556,039 B2

On the page 10, in Column 2, under "Other Publications", Line 22, delete "EagleEtch; TheAnti-glare" and insert -- EagleTech; The Anti-glare --.

On the page 11, in Column 1, under "Other Publications", Line 11, delete "publically" and insert -- publicly --.